US012246528B2

(12) United States Patent
Landa

(10) Patent No.: US 12,246,528 B2
(45) Date of Patent: Mar. 11, 2025

(54) ARRANGEMENTS FOR SECURING CYLINDER JACKETS

(71) Applicant: LANDA CORPORATION LTD., Rehovot (IL)

(72) Inventor: Benzion Landa, Nes Ziona (IL)

(73) Assignee: LANDA CORPORATION LTD., Rehovot (IL)

( * ) Notice: Subject to any disclaimer, the term of this patent is extended or adjusted under 35 U.S.C. 154(b) by 281 days.

(21) Appl. No.: 17/435,694

(22) PCT Filed: Mar. 18, 2020

(86) PCT No.: PCT/IB2020/052448
§ 371 (c)(1),
(2) Date: Sep. 1, 2021

(87) PCT Pub. No.: WO2020/188491
PCT Pub. Date: Sep. 24, 2020

(65) Prior Publication Data
US 2022/0153014 A1 May 19, 2022

(30) Foreign Application Priority Data
Mar. 19, 2019 (GB) ...................................... 1903768

(51) Int. Cl.
*B41F 27/10* (2006.01)
*B41F 21/10* (2006.01)
(Continued)

(52) U.S. Cl.
CPC .......... *B41F 27/105* (2013.01); *B41F 21/104* (2013.01); *B41F 27/1262* (2013.01); *B41F 31/16* (2013.01)

(58) Field of Classification Search
CPC ........ B41F 27/105; B41F 27/02; B41F 21/04; B41F 21/104
See application file for complete search history.

(56) References Cited

U.S. PATENT DOCUMENTS 3,650,211 A * 3/1972 Nentwich ............. B41F 21/104 101/409
5,019,860 A 5/1991 Matsuo et al.
(Continued)

FOREIGN PATENT DOCUMENTS

CN 1077681 A 10/1993
CN 101352958 A 1/2009
(Continued)

OTHER PUBLICATIONS

JP2012058633A Machine Translation (by EPO and Google)—published Mar. 22, 2012; Seiko Epson Corp.
(Continued)

*Primary Examiner* — Jennifer Bahls
*Assistant Examiner* — Quang X Nguyen
(74) *Attorney, Agent, or Firm* — Marc Van Dyke; Momentum IP

(57) ABSTRACT

A jacket-securing arrangement is disclosed for mounting in a cylinder, which cylinder (220) has an outer surface and at least one recess (320) in the outer surface for receiving an inwardly turned edge of a replaceable jacket (225) overlying at least part of the outer surface of the cylinder. The jacket-securing arrangement is mountable within the recess so as not to project beyond the outer surface of the cylinder when the jacket is secured thereto, and includes a clamping lever pivotable about a shaft located within the recess between a clamping position in which the edge of the replaceable jacket is clamped between the lever and a side wall of the recess and a release position in which the lever is spaced from the side wall of the recess. A magnet is provided to retain the lever in the clamping position. The clamping lever is formed of two or more members assembled around the shaft and defining between them a bearing surface engaging an outer surface of the shaft. The
(Continued)

shaft may be a gripper shaft including a plurality of grippers for securing a printing substrate sheet to the outer surface of a substrate transport cylinder of a printing system, the jacket-securing arrangement being disposed between grippers.

16 Claims, 17 Drawing Sheets

(51) Int. Cl.
*B41F 27/12* (2006.01)
*B41F 31/16* (2006.01)

(56) References Cited

U.S. PATENT DOCUMENTS

| | | | | | |
|---|---|---|---|---|---|
| 5,029,525 | A | * | 7/1991 | Jeschke ................ | B65H 29/585<br>101/DIG. 45 |
| 5,408,297 | A | | 4/1995 | Matsuo et al. | |
| 5,473,407 | A | | 12/1995 | Fuchioka et al. | |
| 5,555,812 | A | * | 9/1996 | Ruckmann .......... | B41F 27/1206<br>101/477 |
| 5,678,486 | A | * | 10/1997 | Bachmeir ............... | B41F 21/10<br>101/409 |
| 9,290,016 | B2 | | 3/2016 | Landa et al. | |
| 2005/0150408 | A1 | | 7/2005 | Hesterman | |
| 2006/0042486 | A1 | | 3/2006 | Forch et al. | |
| 2010/0282101 | A1 | | 11/2010 | Masuda | |
| 2015/0022602 | A1 | | 1/2015 | Landa et al. | |
| 2017/0160677 | A1 | | 6/2017 | Portnoy et al. | |
| 2021/0370667 | A1 | | 12/2021 | Lean et al. | |
| 2022/0388300 | A1 | | 12/2022 | Lean et al. | |

FOREIGN PATENT DOCUMENTS

| | | | | | |
|---|---|---|---|---|---|
| CN | 101578179 | A | | 11/2009 | |
| CN | 204184059 | U | | 3/2015 | |
| CN | 108472825 | A | | 8/2018 | |
| DE | 102004031767 | A1 | | 1/2006 | |
| DE | 102008060557 | A1 | | 6/2010 | |
| DE | 102016209344 | A1 | | 5/2017 | |
| EP | 0495320 | A1 | | 7/1992 | |
| EP | 2823362 | B1 | | 1/2020 | |
| GB | 764560 | | | 12/1956 | |
| JP | S6072241 | U | | 5/1985 | |
| JP | H11198342 | A | | 7/1999 | |
| JP | 11227164 | A | * | 8/1999 | |
| JP | 2012058633 | A | | 3/2012 | |
| JP | 2013226654 | A | | 11/2013 | |
| JP | 2015514606 | A | | 5/2015 | |
| JP | 2015524756 | A | | 8/2015 | |
| JP | 2016155369 | A | | 9/2016 | |
| JP | 2019217664 | A | | 12/2019 | |
| WO | WO-9942290 | A1 | * | 8/1999 | ............ B41F 21/104 |
| WO | 2004013704 | A1 | | 2/2004 | |
| WO | WO-2017208152 | A1 | * | 12/2017 | ............ B41J 2/0057 |
| WO | 2018029085 | A1 | | 2/2018 | |

OTHER PUBLICATIONS

JP2013226654A Machine Translation (by EPO and Google)—published Nov. 7, 2013; Komori Corp.

JP2015524756A Machine Translation (by EPO and Google)—published Aug. 27, 2015; Heidelberger Druckmaschinen AG.

JP2016155369A Machine Translation (by EPO and Google)—published Sep. 1, 2016; Xerox Corp.

JP2019217664A Machine Translation (by EPO and Google)—published Dec. 26, 2019; Canon KK.

WO2018029085A1 Machine Translation (by EPO and Google)—published Feb. 15, 2018; Koenig & Bauer AG.

CN101352958A Machine Translation (by EPO and Google)—published Jan. 28, 2009; Jianping Shen.

CN101578179A Machine Translation (by EPO and Google)—published Nov. 11, 2009; Komori Printing Mach.

CN1077681A Machine Translation (by EPO and Google)—published Oct. 27, 1993; Heidelberger Druckmasch AG [DE].

CN108472825A Machine Translation (by EPO and Google)—published Aug. 31, 2018; Koenig & Bauer AG.

CN204184059U Machine Translation (by EPO and Google)—published Mar. 4, 2015; Riso Kagaku Corp.

JPH11198342A Machine Translation (by Google Patents)—published Jul. 27, 1999; Mitsubishi Heavy Ind Ltd.

JPS6072241U Machine Translation (by Google Patents)—published May 21, 1985; Toru Hashido et al.

* cited by examiner

ALTERNATIVE PARTIAL END VIEW

*N*=10

----------------ASSEMBLED STATE ON GRIPPER SHAFT---------------

UNASSEMBLED STATE – COMPLETE DISASSEMBLY

UNASSEMBLED STATE – LINKAGE ARRANGEMENT

ALTERNATIVE EMBODIMENT

ARRANGEMENTS FOR SECURING CYLINDER JACKETS

CROSS-RELATED APPLICATION

This application is the U.S. national stage of International Patent Application No. PCT/IB2020/052448, filed on Mar. 18, 2020, which claims Paris Convention priority from GB patent application No. 1903768.8, filed on Mar. 19, 2019, the entire contents of which are hereby incorporated by reference as if fully set forth herein.

FIELD

The present invention relates to devices and methods for securing cylinder jackets to cylinders, such as used in printing systems.

BACKGROUND

Printing can be divided into direct and indirect processes, depending on the surface upon which an ink image is first deposited. In the former printing method, the ink image is directly deposited on a printing substrate, whereas in the latter process the ink image is first formed on an intermediate surface. Conventional offset printing processes include lithography, flexography, gravure and screen printing. But the ink image can also be digitally created by a number of techniques. Printing devices can, for instance, use an indirect inkjet printing process in which an inkjet print head is used to deposit ink droplets forming an ink image onto the surface of an intermediate transfer member, which is then used to transfer the image onto a substrate. The intermediate transfer member (ITM) may be any suitable plate, drum or endless flexible belt. This latter type of indirect printing may lead to several problems, such as the abrasion of a surface as a result of repeated contact with another or dirt and detritus accumulating, with time, on the ITM and on surfaces contacting it. Such problems can be aggravated when a relatively high pressure is applied to urge contact between the different surfaces, for instance the outer surface of an impression cylinder at the image transfer location may experience an increased rate of deterioration. Moreover, if the printing system performs duplex printing, so-called back transfer can cause dried ink and/or other unwanted materials to transfer from the previously printed image to the surface of the 'perfecting' impression cylinder, adding one more cause for decline in the properties of the cylinder surface.

It has long been known in the printing industry that foil-based jackets can protect the surfaces of impression and/or transport cylinders, and these are commonly used, for example in offset printing presses, whether digital or not. To this end, many printing cylinders are provided with the necessary attachment arrangements for attaching new cylinder jackets. Printing cylinders may include more than one cylinder jacket along a circumferential direction of the cylinder.

GB 764,560 discloses a device for clamping a printing plate to a printing cylinder that employs a lever mounted in a recess in the printing cylinder and a magnet to retain the lever in a position in which it clamps an end of the printing plate against the cylinder.

OBJECT

An aim of the invention is inter alia to enable quick and effective attachment of jackets to cylinders which have no such jacket attachment arrangements provided.

SUMMARY

According to a first aspect of the present invention, there is provided a jacket-securing arrangement for mounting in a cylinder, which cylinder has an outer surface and at least one recess in the outer surface for receiving an inwardly turned edge of a replaceable jacket overlying at least part of the outer surface of the cylinder, wherein the jacket-securing arrangement is mountable within the recess so as not to project beyond the outer surface of the cylinder when the jacket is secured thereto, and includes a clamping lever pivotable about a shaft located within the recess between a clamping position in which the edge of the replaceable jacket is clamped between the lever and a side wall of the recess and a release position in which the lever is spaced from the side wall of the recess, a magnet being provided to retain the lever in the clamping position, wherein the clamping lever is formed of two or more members assembled around the shaft and defining between them a bearing surface engaging an outer surface of the shaft.

In some embodiments, the cylinder in which the jacket securing arrangement can be advantageously implemented is a cylinder of a printing system, such as a cylinder for transporting a printing substrate between stations of a printing system, the transported substrate being optionally subjected to a step of the printing process while being displaced by the cylinder. In the latter case, the cylinder may alternatively be named after the printing step performed therewith, for instance, a cylinder transporting a substrate during impression of an ink image to the substrate can be termed an impression cylinder or a perfecting cylinder, if the impression is to be made on a rear side of a substrate previously printed on its front side.

Impression cylinders, perfecting cylinders and mere transport cylinders (e.g., simply ensuring motion of a substrate along a path from a feeding stack to a delivery pile) often include an arrangement for gripping a leading or tailing edge of a substrate sheet as it is being transported. Therefore, the illustrative foregoing cylinders of a printing system, can be individually or collectively referred to as substrate transport cylinders. The substrate gripping arrangement each such cylinder may include, may comprise a plurality of grippers mounted on a gripper shaft located within a recess in the cylinder. Individual grippers can be fixedly mounted at spaced intervals along the gripper shaft and can be moved between positions in which they grip and release the substrate.

In some embodiments of the invention, the shaft about which the clamping levers of the jacket-securing arrangement are pivotable may be the gripper shaft of an arrangement for gripping an end of substrate sheets transported by the cylinder. In such an embodiment, the clamping levers may be disposed in spaces on the gripper shaft between the substrate grippers. Because the clamping levers are formed of two (or possibly more) members that can be assembled around the shaft while the shaft remains in situ, enables the clamping levers to be retrofitted in existing impression cylinders.

In some embodiments of the invention, the shaft about which the clamping levers of the jacket-securing arrangement are pivotable may be a dual coaxial shaft. In such an embodiment, the grippers may be mounted on one of the coaxial shaft and the clamping levers on the other, the clamping levers being disposed on their shaft in regions corresponding to spaces on the gripper shaft between the substrate grippers.

According to a second aspect, there is provided a cylinder, the cylindrical surface of the cylinder including a recess for receiving an inwardly turned edge of a replaceable jacket overlying at least part of the outer surface of the cylinder, and a shaft located in the recess, wherein the cylinder is further provided with a jacket-securing arrangement as briefly described above and further detailed herein. In some embodiments, the cylinder is for a printing system, optionally for transporting a printing substrate.

According to a third aspect, there is provided a printing system comprising a cylinder having a cylindrical surface, a recess in the cylindrical surface for receiving an inwardly turned edge of a replaceable jacket overlying at least part of the outer surface of the cylinder, a shaft located in the recess, wherein the cylinder is further provided with a jacket-securing arrangement as briefly described above and further detailed herein. In some embodiments, the cylinder of the printing system is for transporting a printing substrate.

According to a fourth aspect, there is provided a kit, the parts of which can be mounted around a shaft to form a jacket-securing arrangement as briefly described above and further detailed herein. In some embodiments, the kit can be used for mounting the jacket-securing arrangement around the shaft of cylinder of a printing system, the cylinder optionally serving for transporting a printing substrate.

According to a fifth aspect, there is provided a method of mounting a jacket-securing arrangement as briefly described above and further detailed herein around a shaft in a recess of a cylindrical surface, the surface optionally being of a cylinder of a printing system, and the method further optionally enabling retrofitting of printing systems, so as to permit use of jacket cylinders.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. Also, in some drawings the relative sizes of objects, and the relative distances between objects, may be exaggeratedly large or small for the sake of convenience and clarity of presentation. In the drawings.

DETAILED DESCRIPTION

Figure 1:
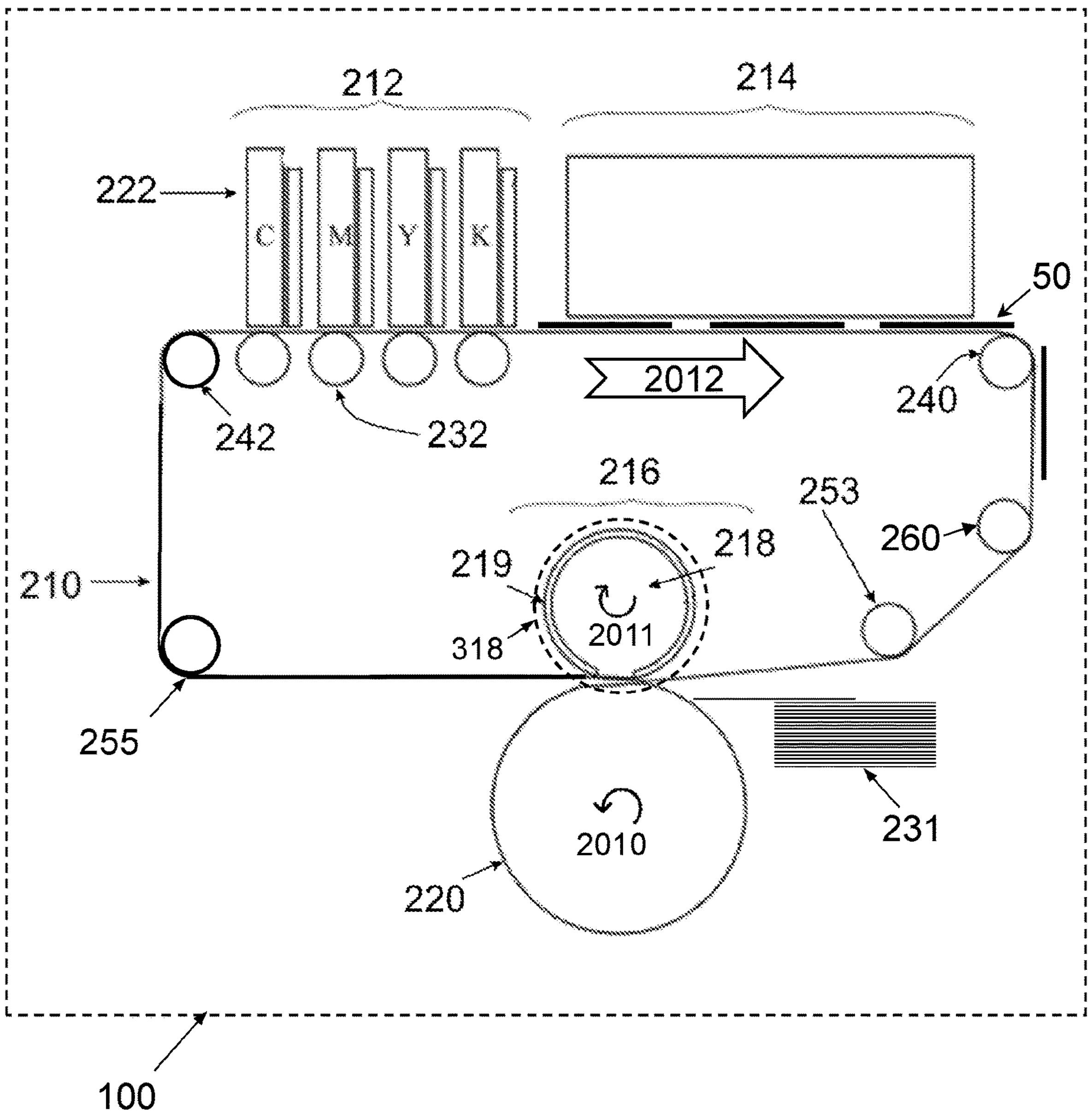
FIG. 1 is an elevation-view schematic illustration of a printing system according to embodiments of the present invention.

Embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

Note: Throughout this disclosure, subscripted reference numbers (e.g., $\mathbf{10}_1$ or $\mathbf{10}_4$) may be used to designate multiple separate appearances of elements of a single species, when in a drawing or not; for example: $\mathbf{10}_1$ is a single appearance (out of a plurality of appearances) of element 10. The same elements can alternatively be referred to without subscript (e.g., 10 and not $\mathbf{10}_1$) when not referring to a specific one of the multiple separate appearances, i.e., to the species in general.

In various embodiments, an ink image is first formed (e.g., selectively deposited or activated) on a surface of an intermediate transfer member (ITM), and transferred from the surface of the intermediate transfer member to a substrate (i.e. sheet substrate or web substrate). The location in the printing system at which the ink is deposited or the image otherwise formed (e.g., by application of energy) on the ITM is referred to as the “image forming station”. In many embodiments described in more details, the ITM comprises a flexible or endless “belt” and the terms “belt” and “ITM” are used interchangeably in such descriptions. However, this should not be construed as limiting, the ITM being, as mentioned, additionally able to include a more rigid body, the ITM being an outer surface of a plate or a drum. Regardless of the type of ITM, the surface upon which the ink image is deposited or formed can also be referred to as the “release surface”, in view of its ability to transfer the ink image at an impression station.

The area or region of the printing press at which the ink image is transferred from the ITM to a substrate is an “impression station”. It is appreciated that for some printing systems, there may be a plurality of impression stations. In some embodiments of the invention, the intermediate transfer member is formed as a belt comprising a reinforcement or support layer coated with a release layer forming the release surface. In other embodiments, the ITM is formed of a plate or a drum coated at their outermost surface with a release layer, so as to form the release surface.

Referring now to the figures, FIG. 1 is a schematic diagram of an example of a printing system 100 for indirect printing according to some embodiments of the present invention. The system of FIG. 1 comprises an intermediate transfer member (ITM) 210 comprising a flexible endless belt mounted over a plurality of guide rollers 232, 240, 260, 253, 255, 242. This figure shows aspects of a specific configuration relevant to discussion of the invention, and the shown configuration is not limited to the presented number and disposition of the rollers, nor is it limited to the shape and relative dimensions, all of which are shown here for convenience of illustrating the system components in a clear manner. In the example of FIG. 1, the ITM 210 rotates in the clockwise direction relative to the drawing, as indicated by arrow 2012. This direction can also be referred to as the “printing direction”.

The printing system 100 can further comprise:

(a) an image forming station 212 comprising print bars, in the number of four in the present illustration: 222A-222D (each designated one of C—for Cyan, M—for Magenta, Y—for Yellow and K—for black). The image forming station 212 is configured to form ink images 50 (only a few being shown the figure) upon a surface of the ITM 210 (e.g., by droplet deposition thereon);

(b) a drying station 214 for drying the ink images; and (c) an impression station 216 where the ink images 50 are transferred from the surface of the ITM 210 to a substrate 231. The substrate 231 is shown as sheet-fed substrate, such as paper or carton product, but it can alternatively be a continuous-feed (web) substrate. The substrate transport system conveying the substrate from a feeding end to a delivery end via the impression station is not shown in the figure.

In the particular non-limiting example of FIG. 1, the impression station 216 comprises an impression cylinder 220 and a pressure cylinder assembly 318 which includes a pressure cylinder 218 and an optional compressible blanket 219 disposed at least around a large portion of the circumference of the pressure cylinder. The impression cylinder 220 is rotatable in the direction indicated by arrow 2010, so as to transport sheets of substrate 231 from a supply stack to a delivery one. The pressure cylinder 218 can rotate synchronously with the impression cylinder 220 but in the opposite direction, as shown by arrow 2011. As is known in the art, the respective rotation of the cylinders forming the impression station (e.g., 218 and 220) can be synchronized through the use of gears and/or bearers on the corresponding cylinders. When the cylinders of the impression station are engaged with one another (urged one against the other), the line of contact between the two may be referred to as the “impression nip”. Disengagement may be achieved by increasing the distance between the axes of rotation of the cylinders, for instance, by lifting-up the pressure assembly 318. Alternatively, the axes of rotation of the cylinders may remain at a same spacing enabling contact, however at least one of the cylinders include a gap, so that as the gap reaches the nip, contact cannot be made with the circumference of the facing cylinder.

The skilled artisan will appreciate that not every component illustrated in FIG. 1 is required. Also, it can be appreciated that such a printing system can include additional features and components such as, for example, a different number of components in the previously described stations (e.g., a different number of print bars in the imaging station), a conditioning station, a cooling station or a cleaning station, to respectively condition (e.g., chemically and/or physically treat), cool or clean the surface of the ITM, if desired. In some embodiments, the printing system can include arrangements for performing duplex printing (i.e. printing a second image on the second side of a substrate printed on its first side), the printing system including an additional substrate transport system allowing to feed the other side of the substrate to the impression station or including a second ('perfecting') impression cylinder for that purpose.

Figure 2:
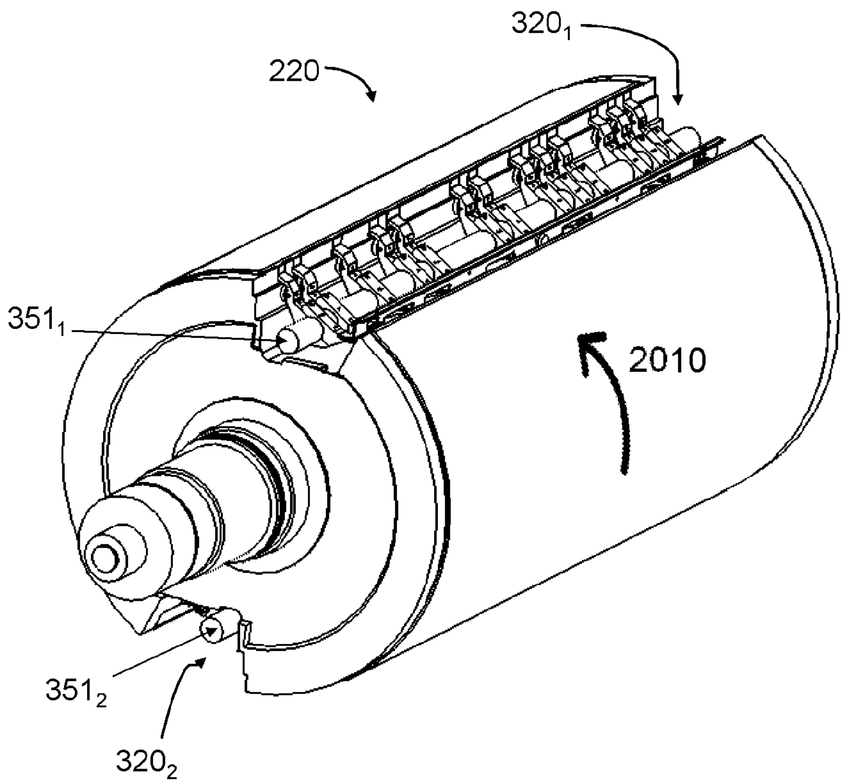
FIG. 2 is a perspective view of an impression cylinder having cylinder gaps, according to embodiments of the present invention.

Referring now to FIG. 2, an example of impression cylinder 220 is shown with additional detail. The cylinder 220 has a first cylinder gap $\mathbf{320}_1$ and a second cylinder gap $\mathbf{320}_2$. A cylinder gap, as is known in the printing industry, is a recess in the circumference of a printing cylinder for housing and/or anchoring ancillary equipment within the gap. Typically, the remainder of the cylinder circumference—from the trailing edge of a first cylinder gap (e.g., $\mathbf{320}_1$) to the leading edge of a second cylinder gap (e.g., $\mathbf{320}_2$)—is smooth. Terms such as 'leading edge' and 'trailing edge' wherever used herein are used within a reference framework having a specific direction of movement during operation of the printing system; in this case, the terms are used with reference to cylinder rotation direction 2010, which is indicated in FIG. 2 by an arrow and which corresponds with the rotation direction indicated in FIG. 1. The smooth surface between the cylinder gaps 320 carries the substrate 231 which receives the ink-images transferred from the ITM.

Figure 3A:
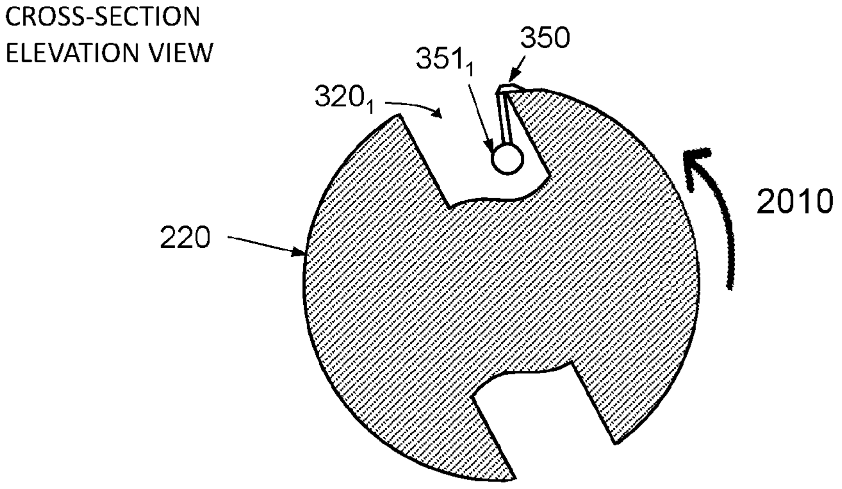
FIGS. 3A and 3B are, respectively, a schematic cross-section (elevation) view and a partial top (plan) view of an impression cylinder with gripper shaft and grippers, according to embodiments of the present invention.
Figure 3B:
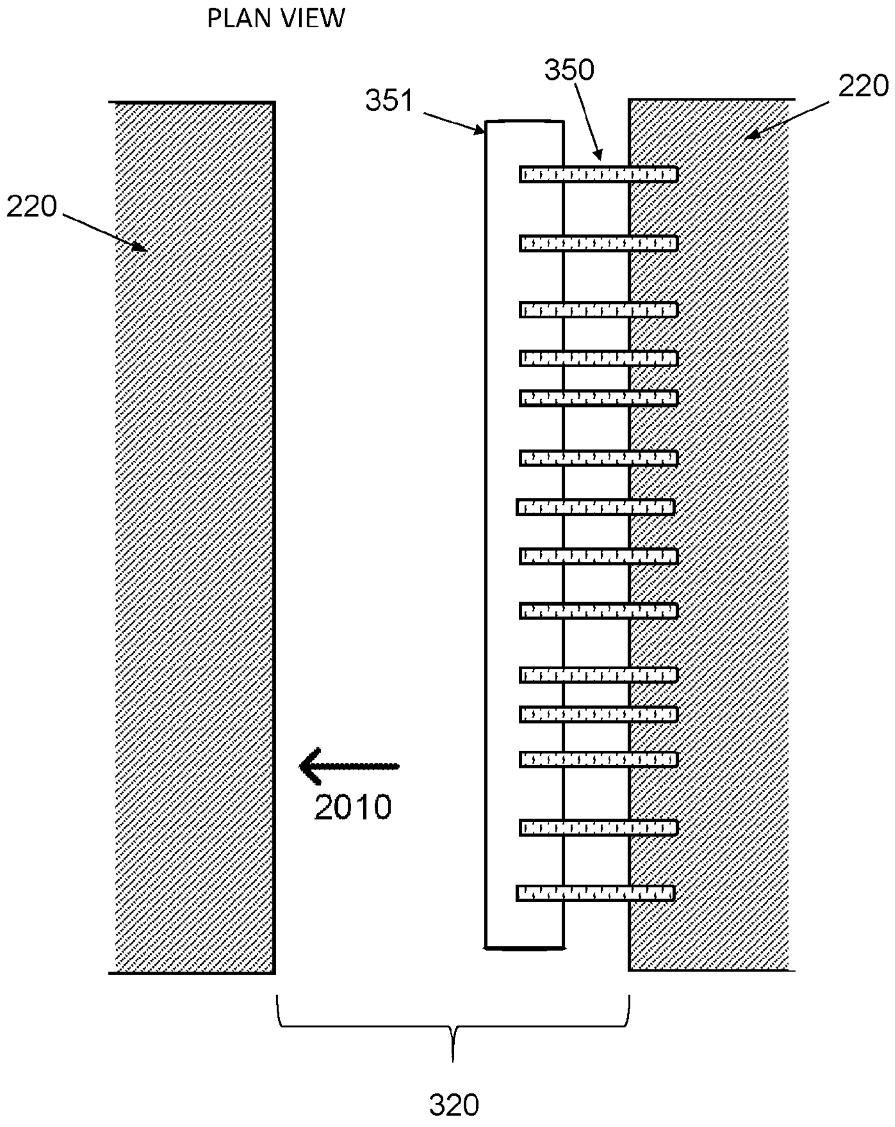

As is known in the printing industry, grippers can be used to grip sheets of substrate 231 on impression cylinders (and on some other types of cylinders, which are not relevant to this disclosure). Grippers serve to releasably engage the sheets on the impression cylinder and to maintain them thereon, often by way of gripper pads at one end of gripper fingers pivotably mounted on an axis. FIGS. 3A and 3B schematically illustrate an impression cylinder 220 wherein a plurality of grippers 350 attached to gripper shaft 351 are substantially recessed (meaning, in this disclosure: either completely recessed, or at least 90% recessed, or at least 80% recessed) inside the impression cylinder gap 320 so as to substantially not extend (meaning: either the grippers 350 do not extend at all, or at most of the grippers 350 extend by 10% or 20%) beyond the circumference of the impression cylinder, i.e., the virtual cylinder where the cylindrical circumference would be without the discontinuity of the impression cylinder gap 320. One of the reasons for selecting a design with recessed grippers can be so as to avoid damage or excessive wear of the ITM 210 as it traverses the impression station 216. Another reason can be to avoid damage or misalignment of the grippers from the same encounter (during every rotation) with the ITM 210. While FIG. 3A is a cross-sectional view showing only a single gripper 350, FIG. 3B is a partial top view showing a plurality of grippers 350 spaced along the length of gripper shaft 351. As can be seen in FIG. 3B, the grippers 350 are not necessarily evenly spaced along the length of the shaft 351. The number and spacing of grippers are illustrative and there can be different numbers of grippers and/or different spacing of grippers in other examples. The grippers 350 extend from the gripper shaft 351 and overlap the trailing edge of the cylinder gap 320 (in the direction of rotation 2010). The grippers 350 can be seen, in both FIGS. 3A and 3B, to overlap a part of the surface of the impression cylinder 220 beyond the edge of the cylinder gap 320.

As is known in the printing industry, cylinder jackets can be provided to cover a surface of a cylinder, including, by way of example, impression cylinders. Advantageously, such jackets should be easy to mount on or remove from the cylinder the cylindrical surface of which they are due to at least partly envelop. In view of this desired capacity, the cylinder jackets can also be referred to as being "releasable jacket(s)" and to the extent they are optionally changed or discarded they may also be referred to as "replaceable jacket(s)".

Figure 4:
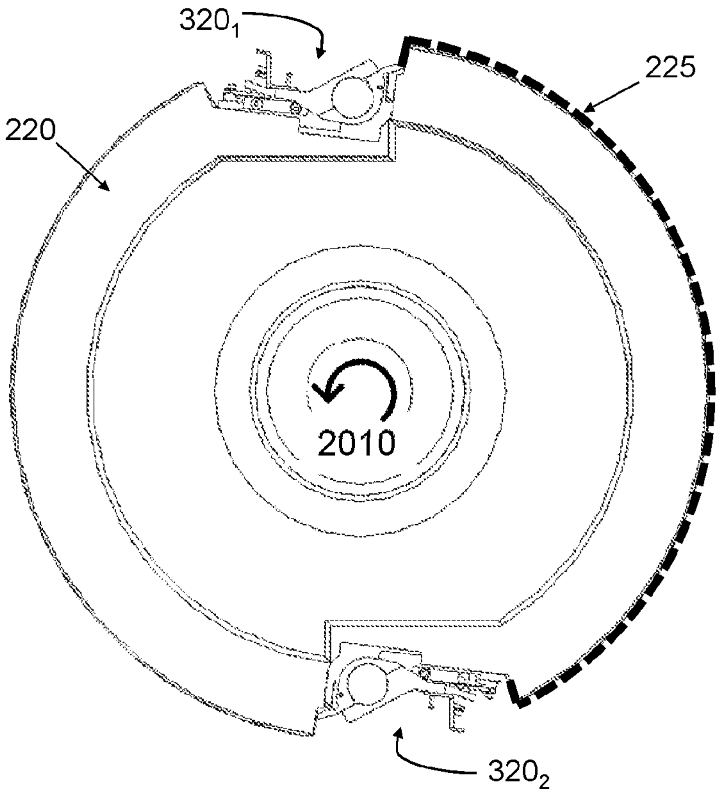
FIG. 4 is an end (elevation) projection view of the impression cylinder and associated equipment of FIG. 2, with a cylinder jacket mounted and secured to the cylinder, according to embodiments of the present invention.

FIG. 4 shows another view of an impression cylinder with a jacket 225 attached on one side of the cylinder, covering the cylinder surface on one smooth circumferential surface between cylinder gaps 320. Although not shown in FIG. 4, the plurality of grippers 350 shown in FIG. 3B may tend to interfere with the attachment of the jacket 225 at its leading edge, i.e., at the edge where grippers 350 are extended from the cylinder gap 320 and cover a small part of the cylinder surface.

Figure 5A:
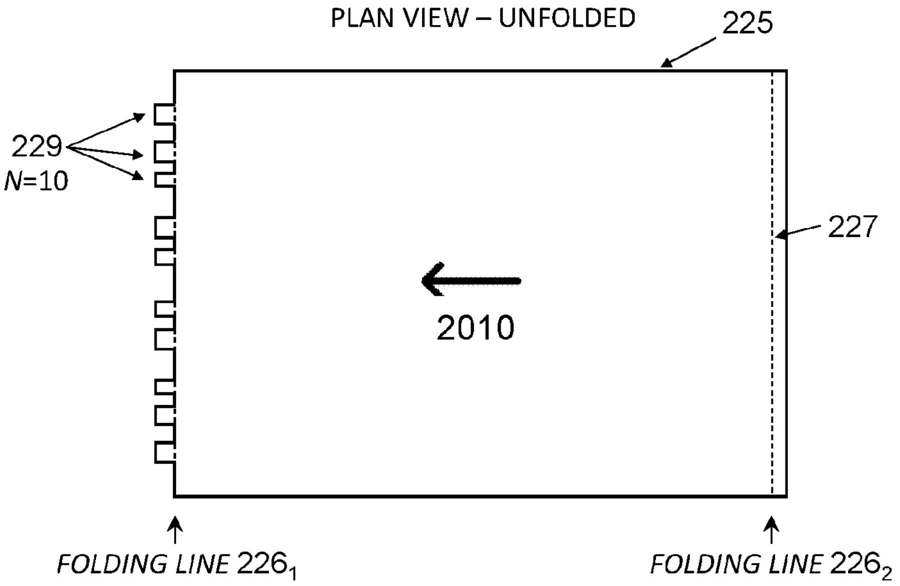
FIGS. 5A and 5B are, respectively, a top (plan) view and an end (elevation) view of a cylinder jacket according to embodiments of the present invention.
Figure 5B:
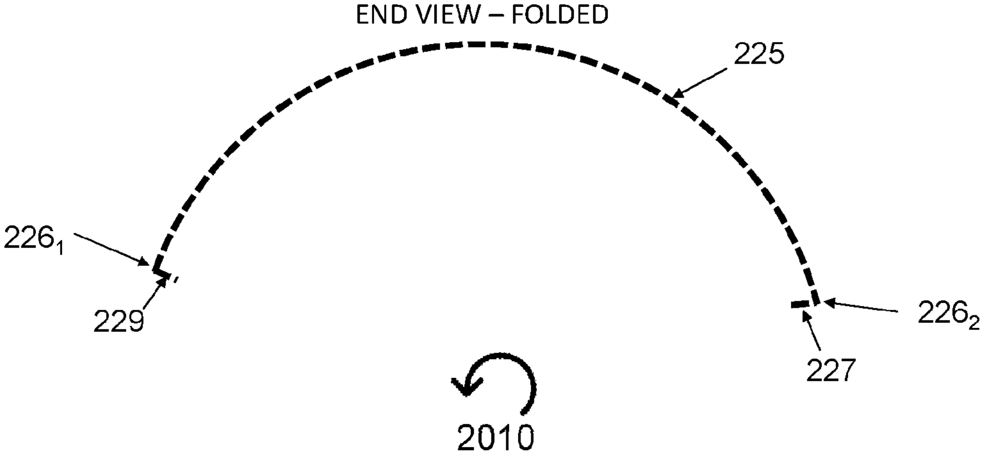

Details of the jacket 225, illustrating an example of how the potential blockage by grippers 350 at the edge of the cylinder gap 320 can be overcome, can be seen in FIGS. 5A and 5B. An examination of FIG. 5B will reveal that the jacket 225 is the same as the one mounted on the cylinder 220 in FIG. 4, but rotated here for convenience. On the leading edge of the jacket 225 (i.e., the leading edge in cylinder rotation direction 2010), a plurality of folded or foldable tabs 229 is provided. The tabs are shown in an unfolded state in FIG. 5A and in a folded state in FIG. 5B. The tabs 229 can be folded at first folding line $\mathbf{226}_1$ so as to facilitate mounting and securing of the jacket 225 on the cylinder 220. Depending on the materials used in fabricating the jacket 225, as well as the geometry of the edge of the cylinder gap 320, the 'folding' may in some embodiments be more like 'bending,' i.e., with a larger radius that does not crease or create a distinct corner. On the trailing edge of the jacket 225, a trailing portion 227 is folded (or bent) at a second folding line $\mathbf{226}_2$ for purposes of mounting and securing on the cylinder 220. The folding of a flat jacket trailing edge shall preferably be by more than 90°, so that the angle resulting in the folded angle of the jacket be of 90° or less, facilitating the retention in the recess of a jacket being "tensioned" at its leading edge by a jacket securing arrangement according to the present teachings.

Figure 5C:
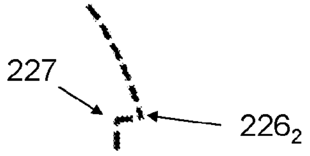
FIG. 5C shows an alternative partial end view of the trailing portion of a cylinder jacket according to embodiments of the present invention.

The foldable trailing portion 227 on the trailing edge of the jacket 225 need not be a solid strip as illustrated, and in some examples of suitable jackets 225, the foldable portion 227 can comprise multiple portions including, for example, tabs similar to tabs 229. As illustrated in FIG. 5C, the foldable portion 227 can include multiple foldable portions that may be designed in accordance with a surface of a specific cylinder gap 320, or of equipment therein, to which the foldable portion conforms when mounted on a cylinder 220.

It is not important where, when and how the folding of the tabs 229 and the trailing portion 227 is performed. In some embodiments, the folding of the tabs 229 and the trailing portion 227 can be factory-performed or supplier-performed, i.e., a jacket 225 is provided with tabs 229 and trailing portion 227 already folded. In other embodiments, the jacket 225 can be provided unfolded, and the folding is performed, e.g., by a jacket installer, whether in situ by placing the jacket 225 on a cylinder 220 and folding the tabs 229 and trailing portion 227 around the edges of the cylinder gaps 320, or as part of preparing a jacket 225 for installation by using a folding jig.

Figure 6:
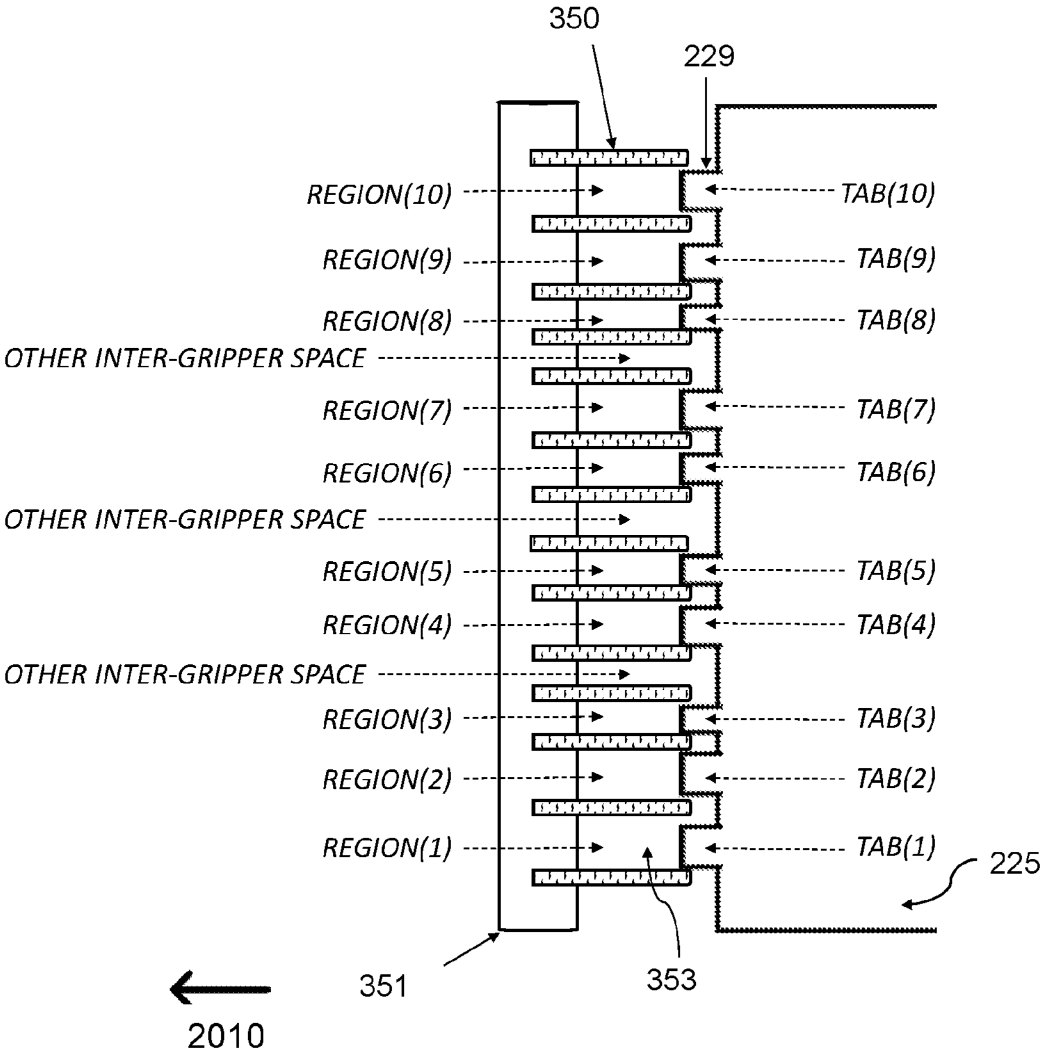
FIG. 6 is schematic illustration of jacket tabs of the jacket of FIG. 5A, and corresponding gripper shaft, grippers and inter-gripper regions of an impression cylinder, according to embodiments of the present invention.

FIG. 6 illustrates schematically how the provision of tabs on the leading edge of a jacket can help to overcome the partial and intermittent 'blocking' of the edge of the cylinder gap by the grippers extending from the cylinder gap so as to cover part of the cylinder surface. The underlying concept is that a folded tab 229 can be inserted between each pair of adjacent grippers 350. On the left side of the diagram of FIG. 6, the gripper shaft 351 and fourteen grippers 350 of FIG. 3B are shown. Between each pair of grippers is a region of space, such that there are thirteen spaces defined by the fourteen grippers. Three of these regions are marked as "other inter-gripper space." These spaces are so marked because, according to a non-limiting example, the presence of other equipment (not shown) in the spaces prevent the insertion of a jacket tab. A common type of equipment present in such cases is a shaft bearing that secures the gripper shaft and allows it to rotate through at least the rotation range necessary for opening and closing grippers when gripping and 'un-gripping' sheets of substrate on the surface of the impression cylinder 220. The other ten between-gripper spaces constitute inter-gripper regions 353 which can be used to accommodate jacket tabs 229. Speaking generally, there can be N inter-gripper regions 353 in which each REGION(n), for every integer value of n from 1 to N, has a set of parameter values. In the non-limiting example of FIG. 6, N is equal to 10, and the N=10 inter-gripper regions 353 are labeled accordingly from REGION (1) to REGION(10). The efficacy of this notation is illustrated when considering the leading edge of jacket 225 having tabs 229 extending therefrom, on the right side of the diagram of FIG. 6. It can be seen that, in this example, ten tabs 229 corresponding to the ten inter-gripper regions 353 are provided, and that for every REGION(n) from REGION (1) to REGION(10), there is a corresponding TAB(n), i.e., from TAB(1) to TAB(10). In this example, the value of N is the same for inter-gripper regions and for tabs. In other examples, there can be more inter-gripper regions 353 than tabs 229, as long as there are enough tabs 229 to enable proper securing of a jacket 225 to a cylinder 220. Conversely, there cannot be more tabs 229 than inter-gripper regions 353, other than by using a 'trick' such as having two 'narrow' tabs instead of one wide one, where of course any such set of 'narrow' tabs in a single inter-gripper region is equivalent for purposes of the invention to a single tab. It will be obvious to the skilled artisan that having more tabs than inter-gripper regions, when the width of the tabs and the spaces between the grippers is such that an inter gripper region can only accommodate a single tab, would mean that 'extra' tabs would be 'blocked' by grippers 350 at the edge of a cylinder gap 320 when mounting a jacket 225 on a cylinder 220.

Figure 7:
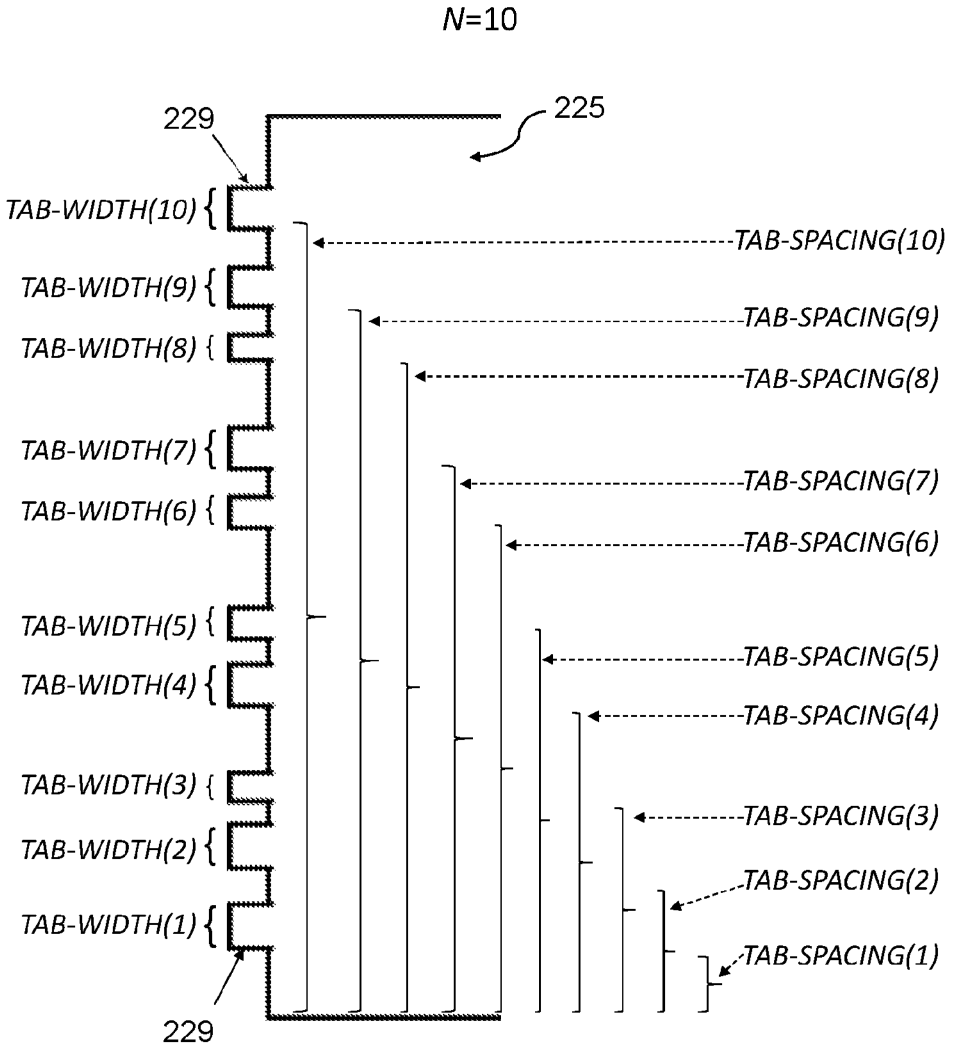
FIG. 7 is an annotated illustration of the jacket tabs of FIG. 6.

We refer now to FIG. 7. For the set of N jacket tabs TAB(n) described in the foregoing discussion, TAB-WIDTH (n) is a one-dimensional array of values of widths corresponding to respective tabs TAB(n). If a tab 229 has a substantially rectangular shape ('substantially' meaning except as modified for manufacturing purposes, e.g., because of cutting radiuses) as per preferred embodiments and as illustrated throughout this disclosure, then the value of TAB-WIDTH(n) is obviously the width of TAB(n) as shown in FIG. 7. In alternative embodiments in which the width is irregular, then TAB-WIDTH(n) can equal the maximum value of the width at any point on the TAB(n). Nonetheless, a substantially rectangular shape can be preferable so as to best facilitate use of the tabs in securing a jacket to the cylinder.

Figure 8:
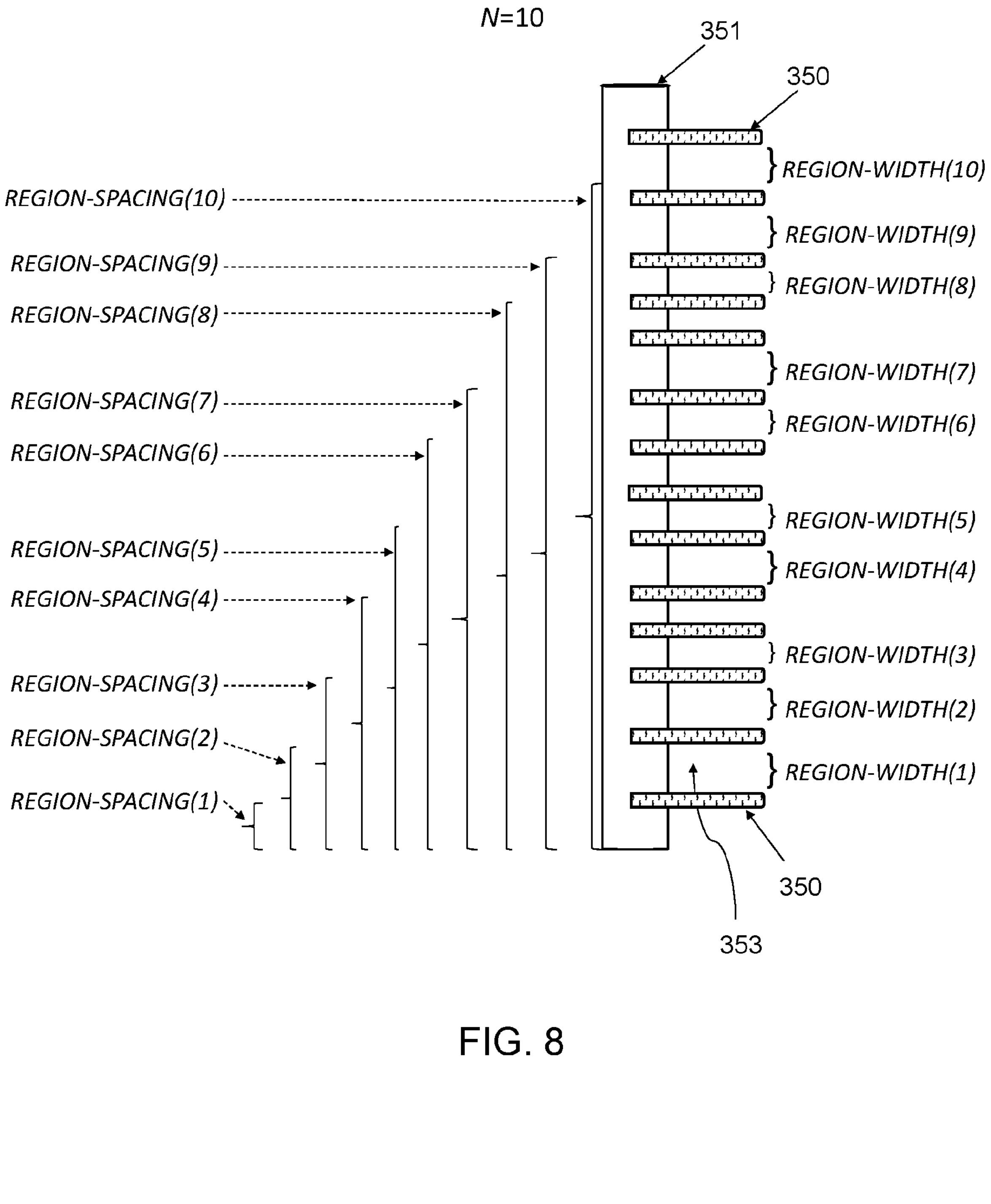
FIG. 8 is an annotated illustration of the gripper shaft, grippers and inter-gripper regions of FIG. 6.

Similarly, TAB-SPACING(n) is a one-dimensional array of values of spacing corresponding to respective tabs TAB (n). Spacing of tabs can be assessed in different ways. In the example of FIG. 7, TAB-SPACING(n) is assessed as the distance from a lateral edge of the jacket 225 to the 'beginning' of the respective tab, i.e., to the 'bottom' of the tab in the plan view of FIG. 7. Alternatively, spacing can be from tab to tab (beginning-to-beginning, ending-to-ending or centerline to centerline), from jacket lateral edge to centerline of tab, from jacket lateral edge to ending of tab, and so on. It is obviously important that the same approach be taken for all tabs and, with reference to FIG. 8, for inter-gripper regions as well. FIG. 8 illustrates one-dimensional arrays REGION-SPACING(n) and REGION-WIDTH(n) respective of the set of inter-gripper regions REGION(n) described earlier in the discussion of FIG. 6.

As long as the spacing values of REGION-SPACING(n) are assessed in the same manner as were the spacing values of TAB-SPACING(n), it is possible to link the width and spacing parameters of tabs 229 to those of inter-gripper regions 353. For each integer value of n from 1 to N, it is preferable that TAB-SPACING(n) be substantially equal to REGION-SPACING(n), and it is also preferable that TAB-WIDTH(n) be no larger than REGION-WIDTH(n). It is especially preferable that each TAB-WIDTH(n) be smaller than the corresponding REGION-WIDTH(n). These conditions allow respective tabs 229 to fit (and, preferably, fit easily without interference or friction) within corresponding respective inter-gripper regions 353 when a tabbed jacket 225 is mounted on a cylinder 220. The phrase 'substantially equal to' earlier in this paragraph should be understood to mean that the combination of tab and region spacings and widths is such that each of the tabs 229 fits properly in the corresponding inter-gripper region 353. It should be obvious from the foregoing that if the tolerance or imprecision of the respective spacing variables is large, then it is likely that the difference between tab widths and corresponding region widths (i.e., extra space between grippers 350) for any values of n needs to be larger in order to ensure proper fit of the tabs 229 in the corresponding inter-gripper regions 353. On the other hand, if the spacings of the tabs and corresponding regions are exactly equal, then the difference in the respective widths of tabs and corresponding regions can be very small.

The foregoing discussion dealt primarily with the provision of tabs of appropriate widths and spacings so as to allow a jacket to be mounted on a cylinder with the tabs inserted into the inter-gripper regions at the trailing edge (in the rotation direction) of a cylinder gap. The following paragraphs discuss apparatus and methods for magnetically securing the jacket tabs to a surface of the cylinder gap and thereby reversibly securing the leading edge of a mounted cylinder jacket to the cylinder.

Printing cylinders commonly include a ferromagnetic material such that it is possible to secure a jacket to the cylinder using magnets. However, in the present embodiments, the area of a cylinder gap in which such magnetic securing is likely to take place is also used to house the gripper shaft and set of grippers. Thus, there is little or no access for an operator's hand or tool to accurately place a magnet, or forcefully remove a magnet from the surface of the cylinder gap to which a jacket tab may be magnetically secured. And even if there were enough access for a tool, it would be difficult to find the leverage necessary to remove the magnet from the cylinder gap surface, as the magnet may have a magnetic pull strength of more than 5 kg or more than 10 kg or more than 20 kg.

Figure 9A:
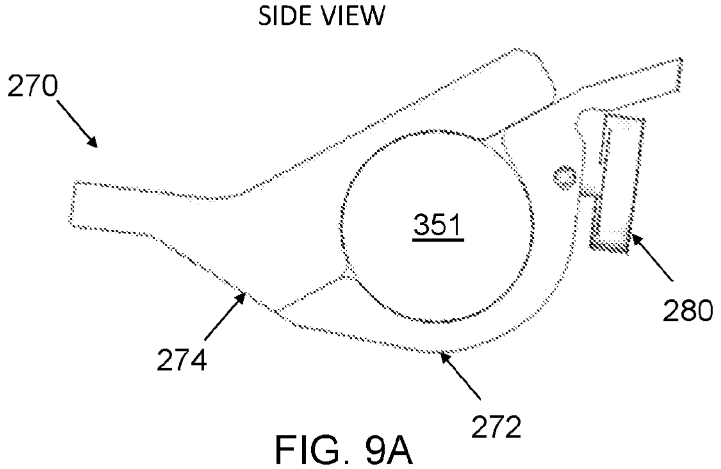
FIGS. 9A and 9B, are, respectively, side and top views of a jacket-securing arrangement according to embodiments of the present invention, in an assembled state on a gripper shaft.
Figure 9B:
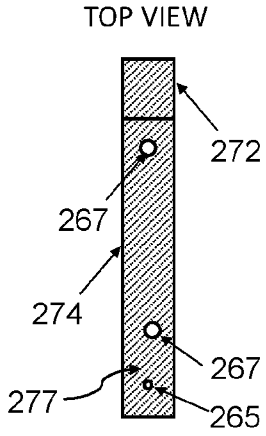

Referring now to FIGS. 9A and 9B, a jacket-securing arrangement 270 according to some embodiments of the present invention comprises a two-armed bell-crank clamping lever formed of first and second members 272, 274. In other embodiments, not illustrated, a jacket-securing arrangement 270 may include more than two members. For instance, first member 272 may itself be formed of two sub-members, which may, by way of example, facilitate the attachment of a magnet 280 to one of the sub-members prior to securing it to the other sub-member, so as to form the shape sought for the first member. Regardless of the number of members (including sub-members), or of the presence of magnets on any of the members or on a wall of the recess, such members and elements of the jacket securing arrangement can constitute a pivotable clamping lever. The jacket-securing arrangement 270 of FIG. 9A is shown in an assembled state. The assembled state of jacket-securing arrangement 270 according to some embodiments satisfies the following features:

- The two members 272, 274 are releasably attached to each other. This can be accomplished effectively, for example, by providing one or more pre-drilled holes 267, e.g., for screws or bolts, passing through the second member 274, and corresponding receiving portion(s) (not shown—they are obscured in FIG. 9B by second member 274), e.g., threaded receptacles in the first member 272 for receiving the screws or bolts. In one embodiment, the screws are captive screws. Two holes 267 are shown so as to accommodate two respective screws, which are disposed one on each side of the shaft, but there can be any number.
- The assembled jacket-securing arrangement 270 is rotatably mounted around gripper shaft 351. The jacket-securing arrangement must be able to freely rotate (in terms of the gripper shaft 351) although the range of its rotation may be otherwise limited by the confines of the cylinder gap 320. The members 272, 274 are each formed with part of a bearing surface to permit the clamping lever to rotate about the axis of the gripper shaft 351. In the non-limiting example of FIG. 9A and subsequent figures, each of the members 272, 274 has a part-cylindrical surface for engaging the circumference of the gripper shaft 351.
- The assembled jacket-securing arrangement 270 is disposed in an inter-gripper region, such as in any REGION(n) as discussed in connection with FIG. 6. The skilled artisan will understand that in the embodiments illustrated, the jacket-securing arrangement 270 can only be disposed in an inter-gripper region 353 because otherwise a gripper 350 or other equipment (e.g., shaft bearing 269) will preclude such disposition.

The jacket-securing arrangement also includes a magnet 280, such as a neodymium magnet. The magnet 280, in the example of FIG. 9A, is fixedly attached to the first member 272, although in alternative embodiments the magnet 280 can be attached to another part of the clamping lever. The magnet 280 can be attached directly to a member of the jacket-securing arrangement 270 or, alternatively, it can be installed in a magnet holder (not shown) which is fixedly attached to the member.

In some embodiment, a magnet 280 may alternatively or additionally be secured to the wall of the recess and the clamping lever may be made of a ferromagnetic material. Such a configuration may be adopted in a situation where the material of the wall of the recess in the cylinder is not strongly ferromagnetic.

Figure 9C:
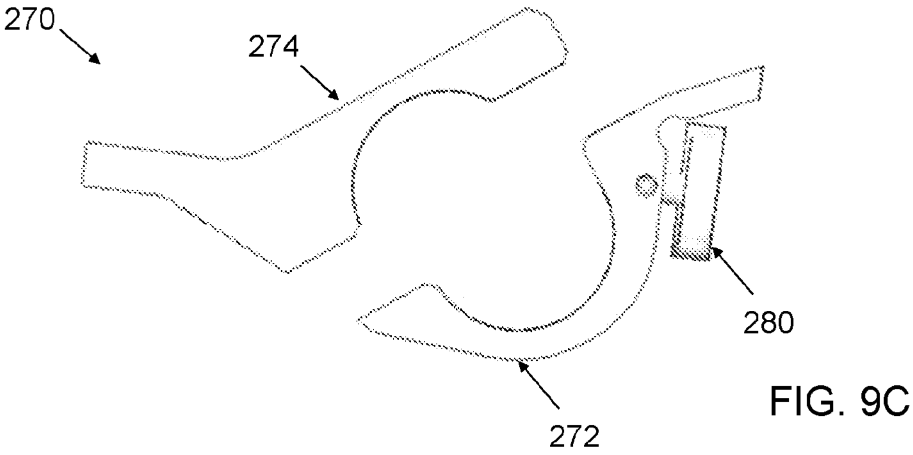
FIGS. 9C and 9D are, respectively, elevation views of the jacket-securing arrangement of FIG. 9A, in a first disassembled state showing complete disassembly, and in a second disassembled state using a linkage arrangement.
Figure 9D:
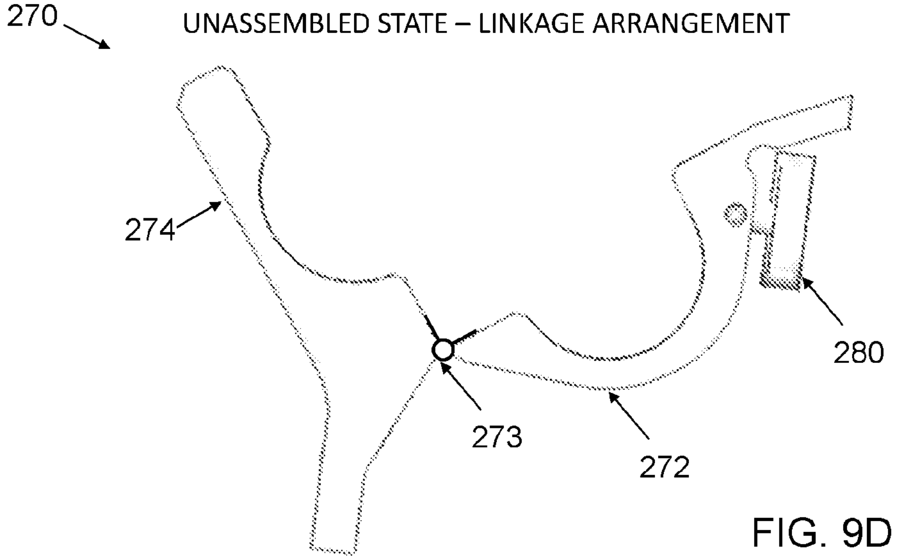

The jacket assembly 270 cannot be mounted on a gripper shaft 351 when in the assembled state. Rather, it must be in an unassembled state. FIG. 9C shows a jacket-securing arrangement 270 in a first unassembled state—the members 272, 274 are completely disassembled and are not connected in any way. FIG. 9D shows a jacket-securing arrangement 270 in a second unassembled state according to an alternative embodiment—the members 272, 274 are connected by a linking arrangement 273. Linking arrangement 273 can comprise a hinge, as shown in FIG. 9D, or it can comprise any other mechanical arrangement, such as a cable, for connecting the two members in the unassembled state. Using a linking arrangement can be beneficial, for example, where the possibility of dropping one of the members into the cylinder gap during installation or removal of the jacket-securing arrangement 270 might be a concern.

Figure 10A:
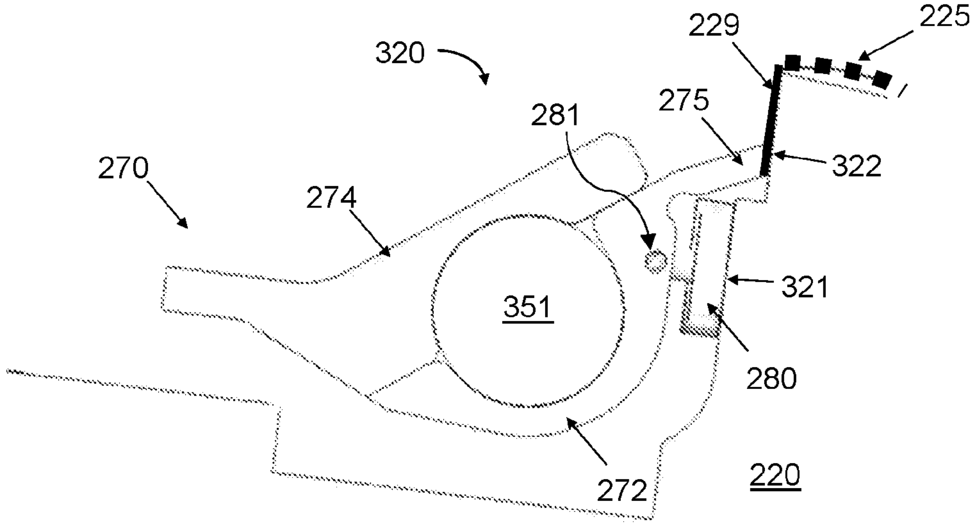
FIGS. 10A and 10C are, respectively, elevation views of a jacket-securing arrangement that is magnetically securing a jacket tab to a surface of a cylinder gap of the impression cylinder of FIG. 2, according to preferred and alternative embodiments of the present invention.

Referring now to FIG. 10A. The jacket-securing arrangement of FIG. 9A, in the assembled state (i.e., rotatably mounted around the gripper shaft 351 and disposed in an inter-gripper region 353), secures a tab 229 of jacket 225 to a surface of the cylinder gap 320. Specifically, the magnet 280 holds the jacket-securing assembly 270 in place, by the force of its magnetic attraction to the surface of the cylinder gap at a first location 321; 'in place' can mean, for example, that the jacket-securing assembly 270 is not easily rotatable when in this position. This magnetic force is effective to cause the securing of an upper portion 275 of first member 272 to the surface of the cylinder gap at a second location 322, with a portion of the jacket tab 229 being 'clamped' or 'trapped' between the upper portion 275 and the surface of the cylinder gap. In other words, the force of the magnetic attraction at the first location 321 causes the 'indirect' [magnetic] securing of the jacket tab 229 at the second location 322. As used herein, the magnetic securing provided by the jacket-securing arrangement, unless otherwise stated or clear from context, encompasses the 'direct' securing of the first magnet on a first part of the cylinder gap (e.g., at a first location 321) and the 'indirect' securing of a portion of the jacket of the impression cylinder to a second part of the cylinder gap (e.g., at a second location 322), for instance by reversible, quick release, mechanical clamping.

In some embodiments, an adjustment mechanism 281 is provided to facilitate manual adjustment (e.g., tightening or loosening) of the connection between the first member 272 and the magnet 280. This can be a useful feature to have available when, for example, imperfections in the surface of the cylinder gap 320 at the first location are such that the magnet is not disposed at the optimal angle when the upper portion 275 contacts the tab 229 at the second location 322 during installation of the jacket-securing arrangement 270. In one non-limiting example, the surface of the cylinder gap 320 at the second location 322 may be machined, while the surface at the first location 321 may be the result of a less precise casting process, the 'step' between the two locations being one artefact of such a two-step manufacturing process.

In some embodiments one or more additional elements can be fastened to a jacket tab 229 for improving the installation process on a cylinder 220 and for otherwise increasing the effectiveness of the use of jacket-securing arrangements 270.

In one example, it can be desirable to affix a jacket tab 229 or multiple jacket tabs 229 lightly to the surface of the cylinder gap 320 before rotating respective jacket-securing arrangements 270 into the first rotated position for long-term magnetic securing of the tabs 229. The folding or bending of the tab(s) 229 may cause 'springiness' in the folds or bends that prevents the tabs 229 from sitting properly in place before the long-term magnetic securing. The tabs 229 are relatively small extensions on a much larger jacket 225, such that properly seating the jacket 225 on the cylinder 220 may leave one or more tabs 229 somewhat 'up in the air' rather than exactly where they need to be, folded down snugly in place against the surface of the cylinder gap 320. Therefore, in some embodiments the jacket installation process can be made more efficient by lightly affixing the jacket tabs 225 to the cylinder gap surface, using sufficient adhesion to temporarily keep the tabs 229 in place long enough to complete the installation process.

In a second example, it can be desirable to increase a frictional resistance force between the upper portion 275 of first member 272 of jacket-securing arrangement 270—the portion of the jacket-securing arrangement 270 most likely to contact the tab 229—and the surface of the tab 229. This may provide some additional security to the attachment of jacket 225 to the cylinder 220 during operation of the printing system 100, when high speeds and high centrifugal forces may otherwise cause slippage of the tabs between the jacket-securing arrangement 270 and the surface of the cylinder gap 320.

Figure 10B:
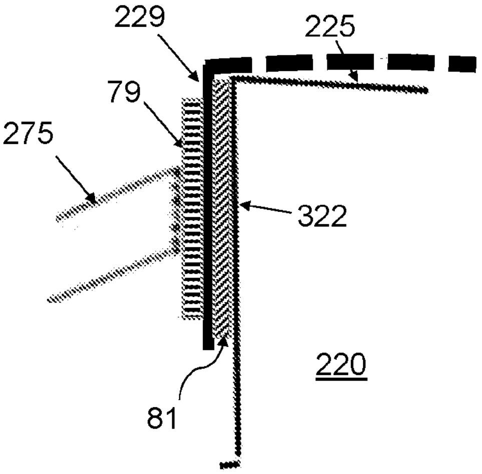
FIG. 10B is a detail view of a jacket tab with an affixing element on one side and a friction pad on the other side, according to embodiments of the present invention.

Referring now to FIG. 10B, an affixing element 81 is caused to adhere to the cylinder-facing side of a jacket tab. In one example, affixing element 81 comprises a small, thin magnet with sufficient force to hold a respective jacket tab 229 in place during installation—but which does not require undue force or special tooling for disconnecting the tab from the cylinder gap surface when the jacket 225 is eventually removed and the jacket-securing arrangement 270 is rotated out of the first rotated position. In another example, affixing element 81 comprises an adhesive tape or film, which can be a two-sided adhesive tape or film, for example a reusable tape or film.

Also illustrated in FIG. 10B is friction pad 79, which can be provided so as to increase a frictional resistance force between the upper portion 275 of first member 272 of jacket-securing arrangement 270, and the surface of the tab 229. Friction pad 79 can comprise a cloth, a rubber, a plastic or any combination of such materials that increases the frictional resistance and can help reduce possible centrifugal slippage of the tab 229 during operation of the printing system 100.

Any number of tabs 229 on a jacket 225, from zero to N (all the tabs) can be equipped with friction pads 79 and/or affixing elements 81. For example, it can be that none are so equipped, or that some tabs 229 are equipped with one or both of a friction pad 79 and an affixing element 81, or even that all tabs 229 are equipped with one or both of a friction pad 79 and an affixing element 81.

Figure 10C:
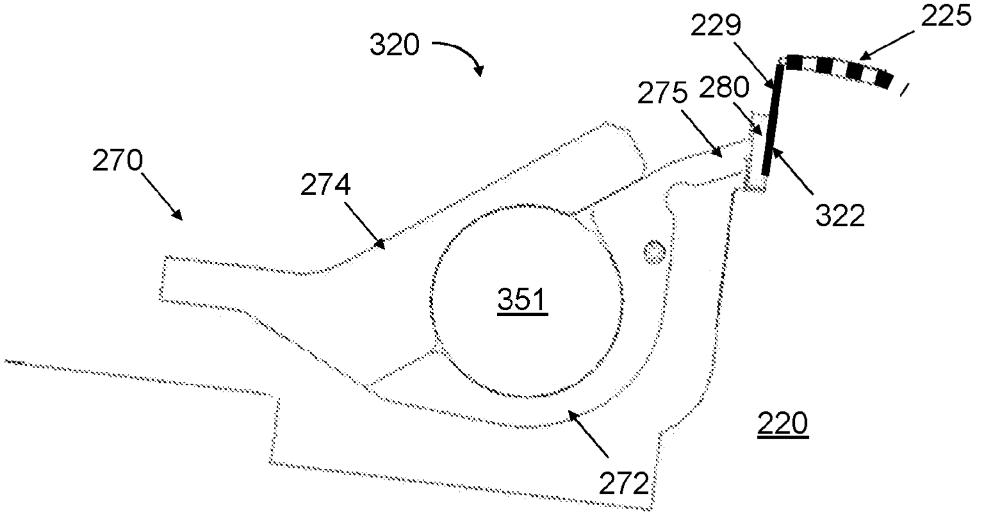

In an alternative embodiment illustrated in FIG. 10C, the magnet 280 can be attached elsewhere, for example to the upper portion 275, such that the magnet directly secures the jacket tab 229 to the surface of the cylinder gap 320 at the 'second' (only) location 322.

Figure 11A:
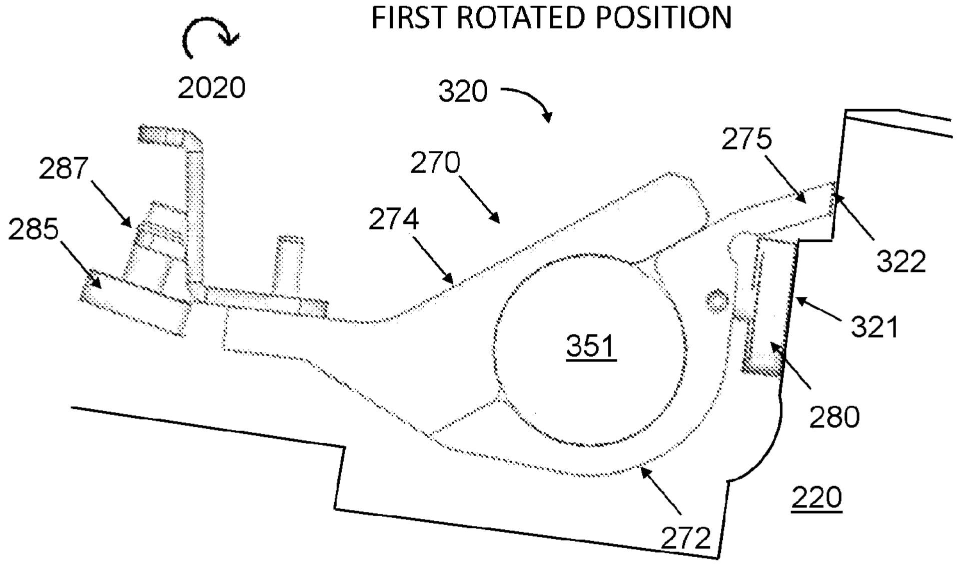
FIGS. 11A and 11B are, respectively, elevation views of a jacket-securing arrangement in an assembled state on a gripper shaft, in a first rotated position and a second rotated position, according to embodiments of the present invention.
Figure 11B:
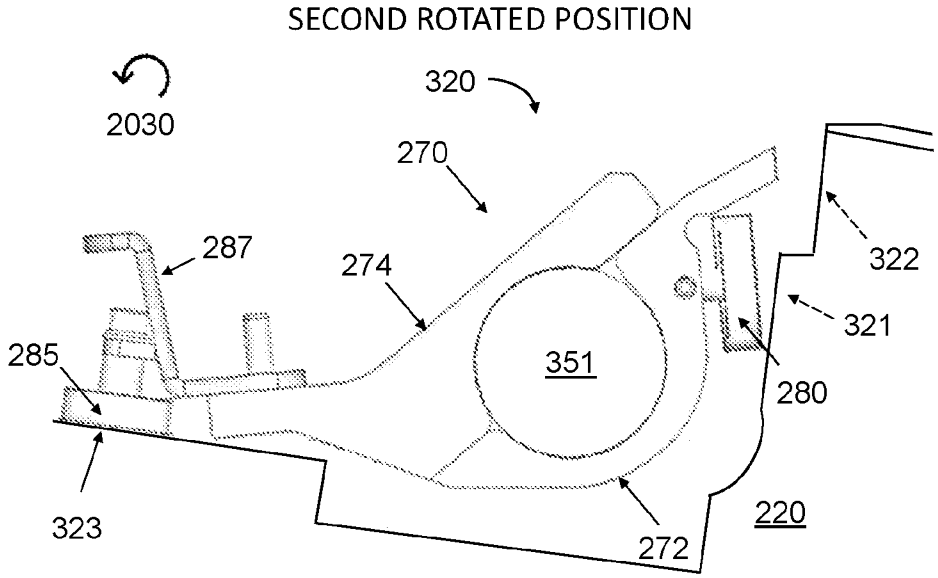

In some embodiments, the magnet 280 is attached to, and at other times removed from, the surface of the cylinder gap 320 at the first location 321 by rotating the jacket-securing arrangement 270 around the gripper shaft 351. In FIG. 11A, the jacket-securing arrangement is in a first rotated position where, as in FIG. 10A, the magnet is in place at the first location 321 on the surface of the cylinder gap 320, and the jacket tab 229 is secured by the upper portion 275 at the second location 322. The first rotation position is thus the 'jacket-securing position'. The rotation of the jacket-securing arrangement 270 to the first rotation position is in the direction indicated by arrow 2020. As shown in FIG. 11A, the jacket-securing arrangement 270 can comprise a second magnet 285 attached to a portion of the jacket-securing arrangement 270 displaced from the first magnet 280. The second magnet can be attached directly or, as shown in FIG. 11A by a bracket 287 that holds the second magnet 285 at a more favorable angle for its purpose. In FIG. 11B, the jacket-securing arrangement 270 is shown in the second rotated position. The rotation of the jacket-securing arrangement 270 to the second rotation position is in the direction indicated by arrow 2030, and is opposite to the direction of rotation to the first rotated position which is indicated in FIG. 11A by arrow 2020. In the second rotated position, as shown in FIG. 11B, the first magnet is displaced from the first location 321 on the surface of the cylinder gap 320. A magnetic attraction between the second magnet 285 and a second surface portion 323 of the cylinder gap 320 holds the jacket-securing arrangement 270 in the second rotated position, the second surface portion 323 being therefore also referred to as the second position surface portion or as a third location of the gap surface. In some embodiments (not illustrated), the second magnet 285 is not provided, and if necessary, other methods of preventing the magnet 280 from 'snapping back' to its regular target of the first location 321 on the surface of the cylinder gap 320 can be used, such as providing a mechanical restraint.

Figure 12:
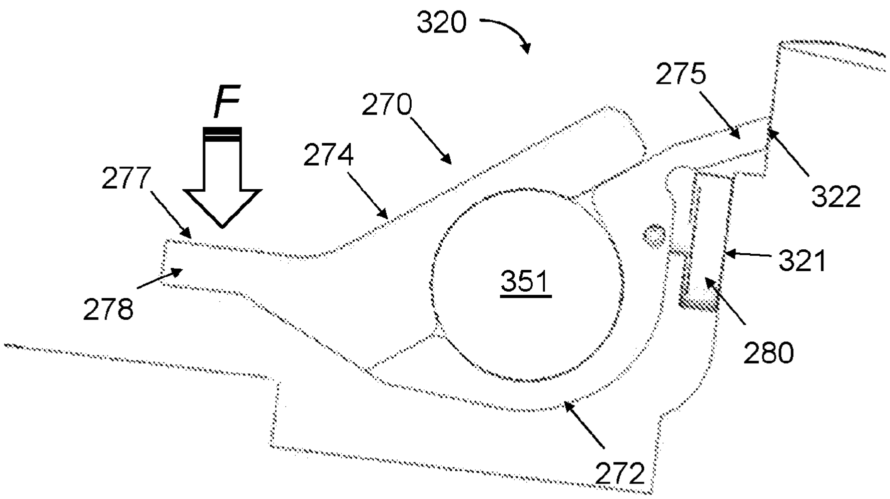
FIG. 12 is an elevation view of a jacket-securing arrangement in the assembled state and in the first rotated position, showing the location of a force on a force-receiving surface of the jacket-securing arrangement, said force being effective for rotating the jacket-securing arrangement away from the first rotated position and in the direction of the second rotated position, according to embodiments of the present invention.

A preferred method for rotating a jacket-securing arrangement to the second rotated position is to apply a force to the second arm of the bell-crank clamping lever (e.g., on the side of second member 274 distal from magnet 280) that will translate to sufficient moment to remove the magnet 280 from where it adheres magnetically to the first location 321 on the surface of the cylinder gap 320. Referring now to FIG. 12, a force F can be applied effectively to a force-receiving surface 277 of the jacket-securing arrangement 270. The force-receiving surface 277 in FIG. 12 is an upward-facing surface of a force-receiving portion 278 of the jacket-securing arrangement 270. The force-receiving portion 278 is provided so as to be diametrically opposite the first location 321 where the magnet 280 is disposed when in the first rotated position—or within ±30° of being diametrically opposed, or within ±15° of being diametrically opposite. The force F can be applied in a downward direction relative to the cylinder gap, meaning roughly parallel to the surface of the cylinder gap 320 at the first location 321. By 'roughly parallel' we mean within 15° either way of being parallel, or within 30° either way of being parallel. The force-receiving surface at the time of applying the force F is roughly perpendicular to the surface of the cylinder gap 320 at the first location 321. By 'roughly perpendicular' we mean within 15° either way of being perpendicular, or within 30° either way of being perpendicular. In this manner, the magnet 280 can be removed relatively more easily and also without direct access by fingers or tool to the magnet 280. The moment removes the magnet 280 by rotating the jacket-securing arrangement 270 away from the first rotated position (and towards the second rotated position) and thereby releases the jacket tab 229 (not shown in FIG. 12) clamped by the upper portion 275 against the surface of the cylinder gap 320 at the second location 322. Neither the second magnet 285 nor its corresponding bracket 287 is shown in FIG. 12, solely for convenience, so that the position of the force F on the force-receiving surface 277 could be illustrated.

Figure 13:
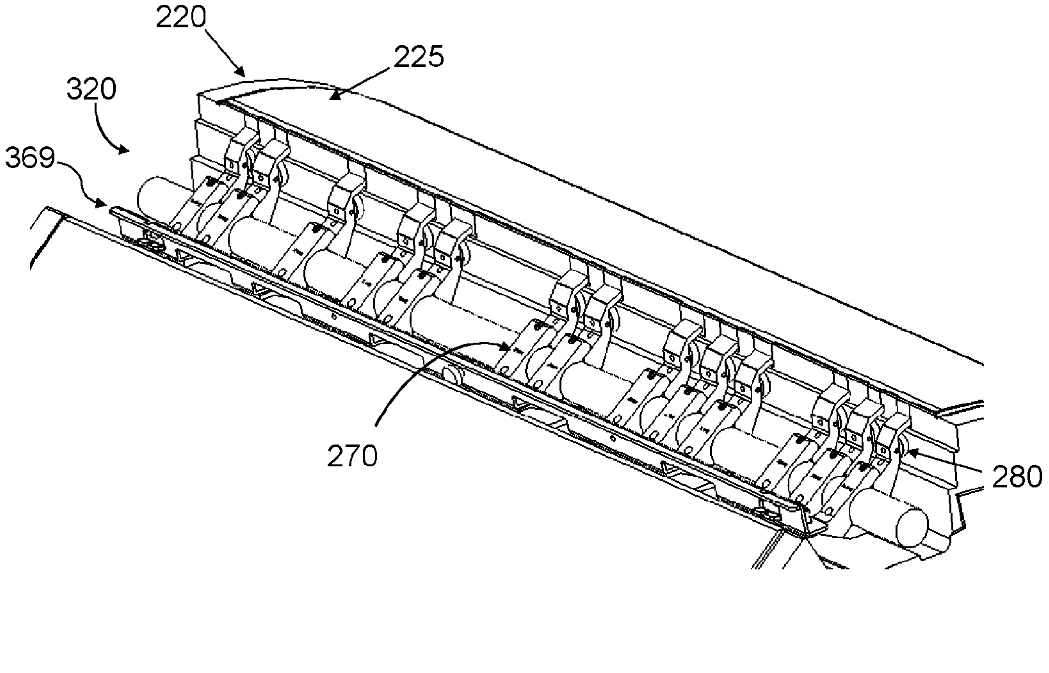
FIG. 13 is a partial perspective view of the cylinder of FIG. 2, including a bracket provided for applying the force of FIG. 12 to a plurality of jacket-securing arrangements, according to embodiments of the present invention.
Figure 14A:
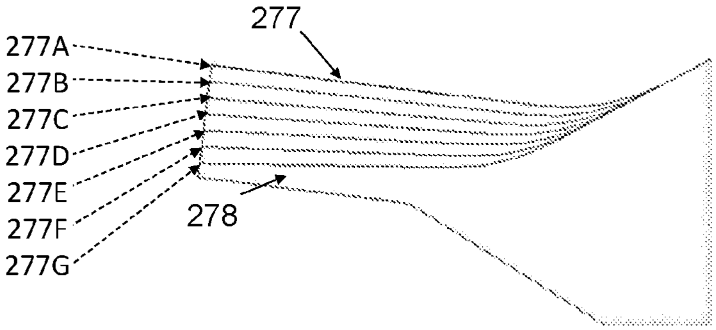
FIG. 14A is a schematic illustration of thickness options for force-receiving portion of a jacket-securing arrangement according to embodiments of the present invention.
Figure 14B:
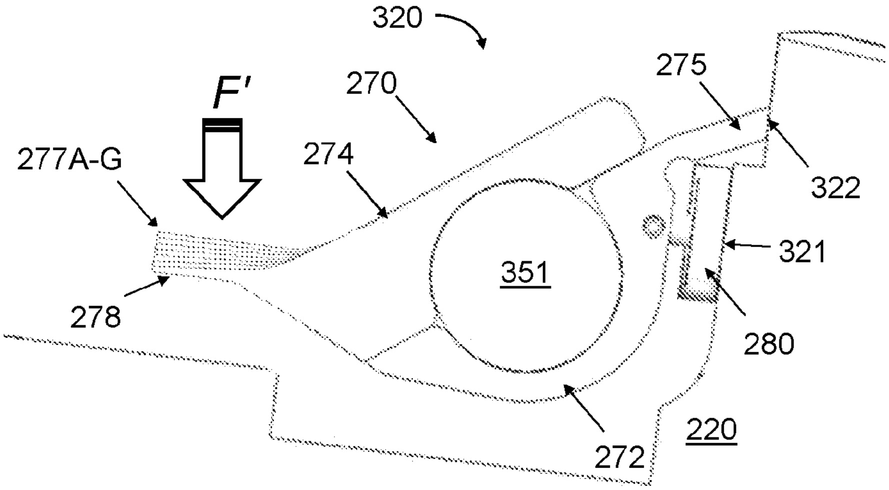
FIG. 14B is an illustration of the integration of the thickness options of FIG. 14A with the elevation view of FIG. 12.

As described in the foregoing paragraphs, the release of the jacket tabs 229 coincident with the release of the magnet 280 from the surface of the cylinder gap 320 is effectively accomplished by leveraging the rotatability of the jacket-securing arrangement 270 around the gripper shaft 351. In this method, applying a moderate force F to the force-receiving portion on the opposite side of the jacket-securing arrangement 270 (i.e., the side of the jacket-securing arrangement 270 that is on the opposite side of the gripper shaft 351) makes it possible to accomplish the release of the magnet 280 with less force than would be necessary to pull it directly off with a force applied at the first location 321. However, removing a jacket 225 from a cylinder 220 involves releasing multiple magnets 280 from the surface of the cylinder gap 320 and rotating multiple jacket-securing arrangements 270 away from the first rotated position. As shown in FIG. 13, there can be more than 5, or more than 10 or more than 15 jacket-securing arrangements 270 provided in a single cylinder gap 320, and there is a like number of magnets 280 to be pulled off the surface of the cylinder gap 320. An elongated, rigid bar or bracket 369 can be provided to apply a force (e.g., P) at each of the force-receiving surfaces 277 of all of the jacket-securing arrangements 270. In some embodiments, even the moderate force F, when multiplied by the number of jacket-securing arrangements 270 present, may prove to be too great a force for an operator to apply all at once to the plurality of jacket-securing arrangements 270. In such embodiments, a method of releasing the jacket tabs 229 can be performed which includes using a bracket 369 to apply a force simultaneously to all of the force-receiving surfaces 277, but without simultaneous rotation of all of the plurality of jacket-securing arrangements 270. According to the method, a thickness of the force-receiving portion 278 can vary among different, and especially adjacent, jacket-securing arrangements. Referring now to FIG. 14A, a schematic illustration of a force-receiving portion 278 (of a jacket-securing arrangement 270) is shown with multiple possible thicknesses and corresponding possible dispositions (or versions) of the upward-facing force-receiving surface 277. Each force-receiving portion 278 can have a variable thickness along its length, but the variable thickness is nonetheless different in each of the thickness possibilities shown in FIG. 14A. For example, the force-receiving portion 278 shown in all previous figures in this disclosure has the maximum thickness possibility of all the possibilities illustrated in FIG. 14A and includes the uppermost force-receiving surface 277A. The second-thickest possible force-receiving portion 278 in FIG. 14A includes force-receiving surface 277B. The third-thickest possible force-receiving portion 278 in FIG. 14A includes force-receiving surface 277C, and so on until the thinnest possible force-receiving portion 278 of the possibilities illustrated in FIG. 14 includes force-receiving surface 277G. The efficacy of this solution can be understood from FIG. 14B, which integrates the illustration of multiple force-receiving portion thicknesses of FIG. 14A with the elevation view of FIG. 12. When disposed in the first rotated position, all of the jacket-securing arrangements 270 are parallel to each other: (a) respective magnets 280 are disposed against the surface of the cylinder gap 320 at respective first locations 321 and therefore are parallel to each other; and (b) the bottom or downward-facing surfaces of the respective force-receiving portions 278 are also parallel to each other.

Figure 14C:
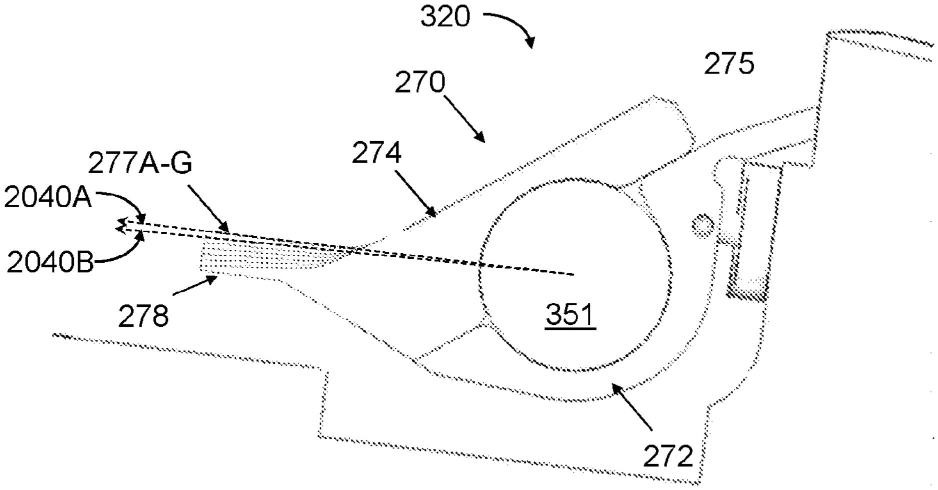
FIG. 14C is an illustration of respective rotation angles associated with two of the thickness options of FIGS. 14A and 14B.

In some embodiments, the relative disposition of different upward-facing force-receiving surfaces 277A, 277B, etc., can be defined by rotation angles with respect to the gripper shaft 351. In FIG. 14C, a force-receiving surface 277A is at a first rotation angle indicated by the arrow 2040A, and a force-receiving surface 277B is at a second rotation angle indicated by the arrow 2040B. Each possible receiving surface 277 can have a different corresponding rotation angle 2040. The rotational difference between the two consecutive rotation angles 2040A and 2040B can be, for example 1°. In some examples, all pairs of respective rotation angles 2040 corresponding to consecutive thickness options are separated by substantially the same 1° angle. In other examples, the separation can involve larger or smaller angles of rotational differences, and not all angles of rotational differences between consecutive thickness options of force-receiving portions need be the same.

When a force F' is applied by a bracket 369 (not shown in FIG. 14B), the following occurs:

At a first time, only those jacket-securing arrangements with 'highest' force-receiving surfaces 277A are contacted by the bracket 369 and are rotated away from the first position by the resulting moment.

At a second time, only those jacket-securing arrangements with force-receiving surfaces 277B are contacted by the bracket 369 and are rotated away from the first position by the resulting moment.

At a third time, only those jacket-securing arrangements with force-receiving surfaces 277C are contacted by the bracket 369 and are rotated away from the first position by the resulting moment.

This continues until the thinnest force-receiving portions 278 (those with the 'lowest' force-receiving surfaces 277, e.g., 277G) are contacted.

The interval between the 'first time' and the 'second time', or between the 'second time' and the 'third time' can be less than a second, less than half a second, or less than one tenth of one second. In some embodiments, the total time elapsed between contacting the highest force-receiving surface 277 (277A) and contacting the lowest force-receiving surface 277 (e.g., 277G or 277F, or 277E, etc., depending on how many different thicknesses of force-receiving portions 278 are deployed) can be less than two seconds or less than one second. Despite the very short time intervals between the contacting of different thickness, the intervals are sufficient to distribute the work of applying forces F' among the different time intervals, and thereby allow the release of all of the respective magnets 280 from the surface of the cylinder gap 320 with a single downward force-application of bracket 369. In some embodiments, no more than two jacket-securing arrangements 270 share the same force-receiving portion thickness. In some embodiments, no more than three jacket-securing arrangements 270 share the same force-receiving portion thickness. In some embodiments, jacket-securing arrangements 270 are arranged so that the distribution of force-receiving portion thicknesses is symmetrical. In one implementation of a symmetrical distribution of force-receiving portion thicknesses, jacket-securing arrangements 270 with force-receiving surfaces 277A are placed as the outermost jacket-securing arrangements 270, i.e., closest to the opposite ends of the cylinder gap 320. Adjacent to them (inter-gripper region 353 closer to the center of the array of jacket-securing arrangements 270) are those with force-receiving surfaces 277B, and then those with force-receiving surfaces 277C, and so on. When such a symmetrical arrangement is deployed, the bracket 369 can be positioned such that a protrusion (not shown) included near each end of the bracket 369 can be fitted to a matching receptacle (265 in FIG. 9B) provided on the force-receiving surfaces 277 (e.g., 277A) of the outermost jacket-securing arrangements 270, which are the first ones contacted during the application of force by the bracket 369. The protrusion-receptacle fitting can be useful in firmly positioning the bracket for the application of the force that rotates the jacket-securing arrangements 270 away from the first rotated position and thereby releases the jacket tabs 229.

Figure 15:
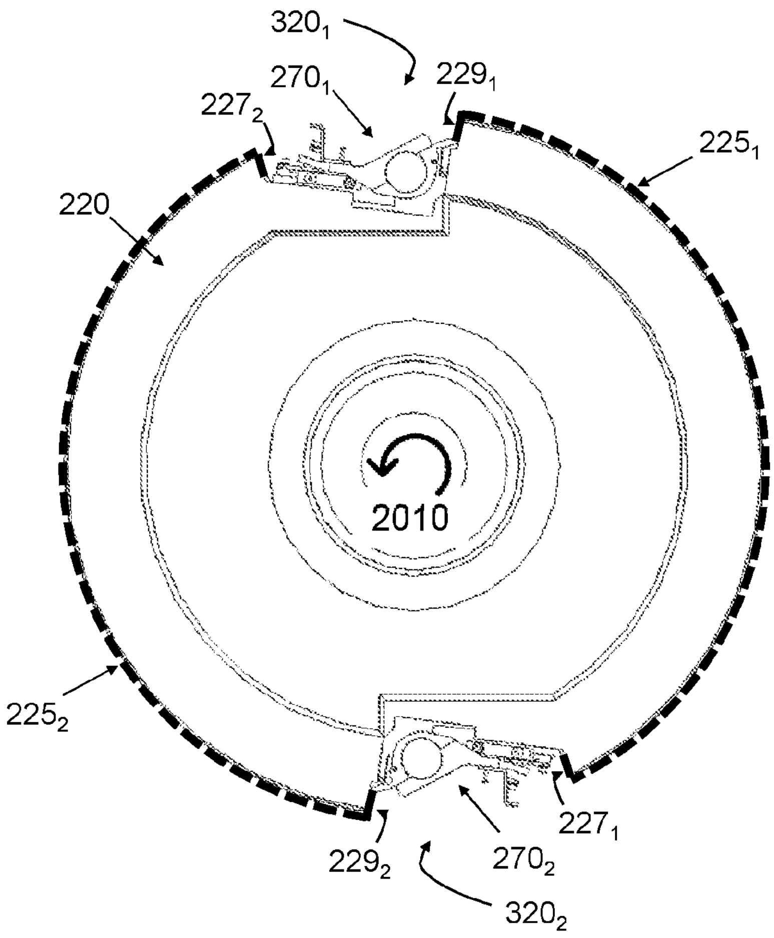
FIG. 15 shows the elevation view of FIG. 3 with two cylinder jackets mounted and secured thereto, according to embodiments of the present invention.
Figure 16:
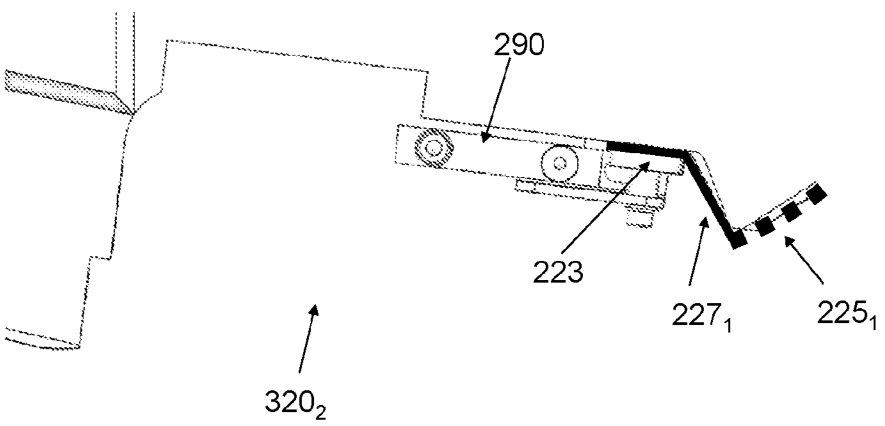
FIG. 16 is a partial view of one of the two cylinder gaps of the impression cylinder of FIG. 15, showing arrangements for securing the end of the jacket that is not the end secured by the jacket-securing arrangement of FIG. 10A, according to embodiments of the present invention.

Referring now to FIGS. 15 and 16. In some embodiments, a printing system 100 can be designed such that an impression cylinder 220 completes one rotation for every two ink-images transferred to substrate 231. In such embodiments, there can be two cylinder gaps and two smooth surfaces therebetween on a cylinder 220, each of the surfaces allowing transfer of one of the ink images from the ITM to each substrate and the surfaces being suitably protected by a cylinder jacket 225. FIG. 15 illustrates an example of such a case, wherein tabs $229_1$ of first jacket $225_1$ are secured by first jacket-securing arrangements $270_1$ in first cylinder gap $320_1$, and tabs $229_2$ of second jacket $225_2$ are secured by second jacket-securing arrangements $270_2$ in second cylinder gap $320_2$. Similarly, a first trailing portion $227_1$ of first jacket $225_1$ is secured in second cylinder gap $320_2$, and a second trailing portion 2272 of second jacket 2252 is secured in first cylinder gap $320_1$.

FIG. 16 shows in greater detail (with the second jacket-securing arrangement $270_2$ removed from the drawing) the securing of first trailing portion $227_1$ within second cylinder gap $320_2$. The trailing portion does not encounter grippers and grippers shafts and therefore can be simply secured to a surface of the cylinder gap without special arrangements. For instance, a trailing edge of the jacket can be inwardly turned to follow an undercut segment of the gap, the undercut wall being recessed with respect to the outer surface of the cylinder. In such case, the folded angle formed by the trailing edge and the jacket shall be of less than 90°. Alternatively, in some embodiments, a trailing edge magnet holder 290 for applying and removing a trailing-portion magnet 223 (or a plurality of trailing-portion magnets 223) is provided for securing the first trailing portion $227_1$.

Figure 17:
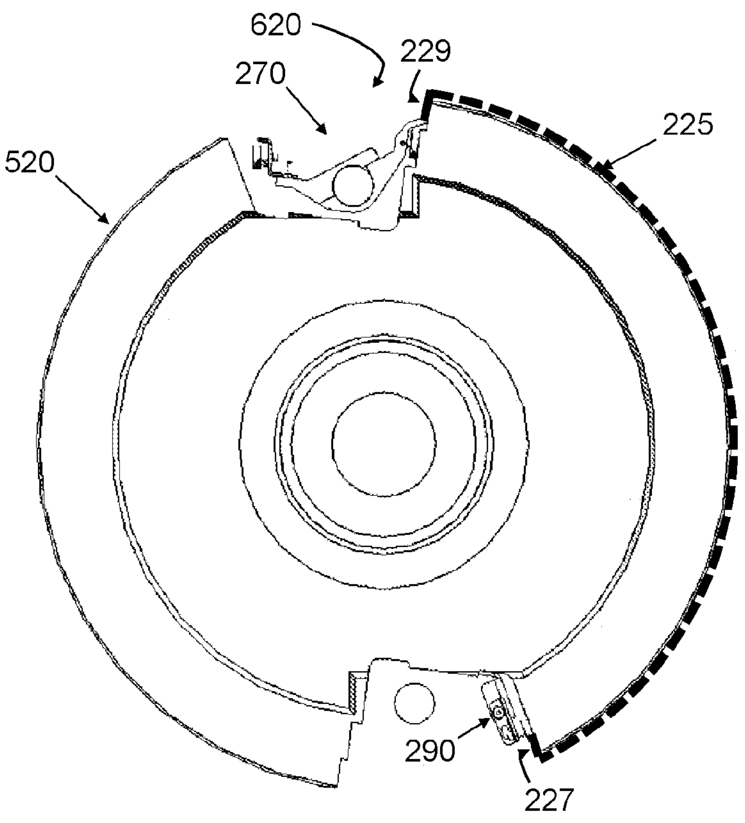
FIG. 17 is an end (elevation) view of a perfecting cylinder suitable for use in a printing system configured for duplex printing, with a cylinder jacket mounted and secured thereto, according to embodiments of the present invention.
Figure 18:
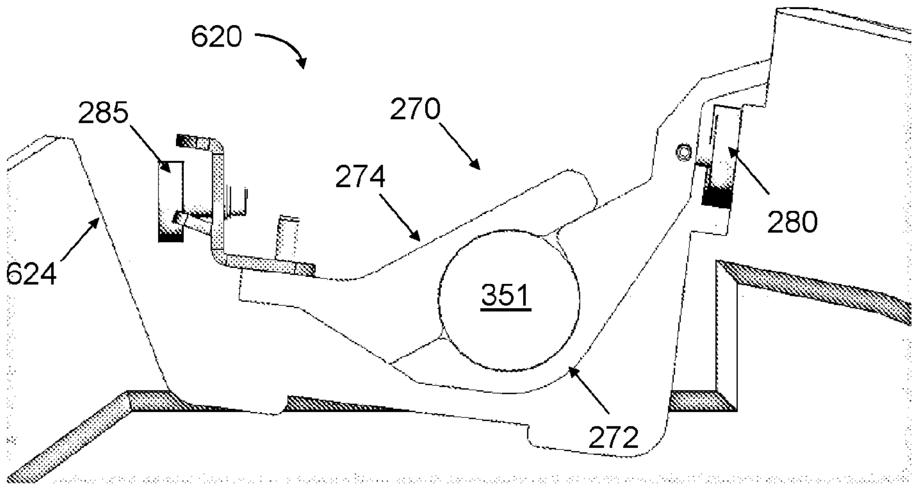
FIG. 18 is an elevation view of a jacket-securing arrangement for use with the perfecting cylinder of FIG. 17, according to embodiments of the present invention.

Referring now to FIGS. 17 and 18, a printing system 100 adapted to enable printing on both sides of a substrate 231 (perfecting) can include a second impression cylinder 520 for that purpose. A jacket 225 according to the various embodiments disclosed herein can be mounted on the perfecting cylinder 520 in the same manner as described for mounting on the 'simplex' impression cylinder 220: a jacket-securing arrangement 270 rotatably mounted on a gripper shaft 351 in cylinder gap 620 magnetically secures a jacket tab 229 to a surface of the cylinder gap 620 using a magnet 280. In the second rotated position, the jacket-securing arrangement 270 of the perfecting cylinder 520 can be positioned with magnet 280 removed from the surface of the cylinder gap 620 (and jacket tab 229 released) by the use of second magnet 285 and its magnetic attraction to opposite cylinder gap surface 624. The arrangement of the second magnet 285 here can be different than the arrangement in the simplex cylinder (FIG. 11B) because of structural differences between the cylinder gaps. This minor difference does not change the underlying concept of using a second magnet 285 to hold the jacket-securing arrangement 270 in the second rotated position, e.g., for replacement of a jacket 225.

Figure 19:
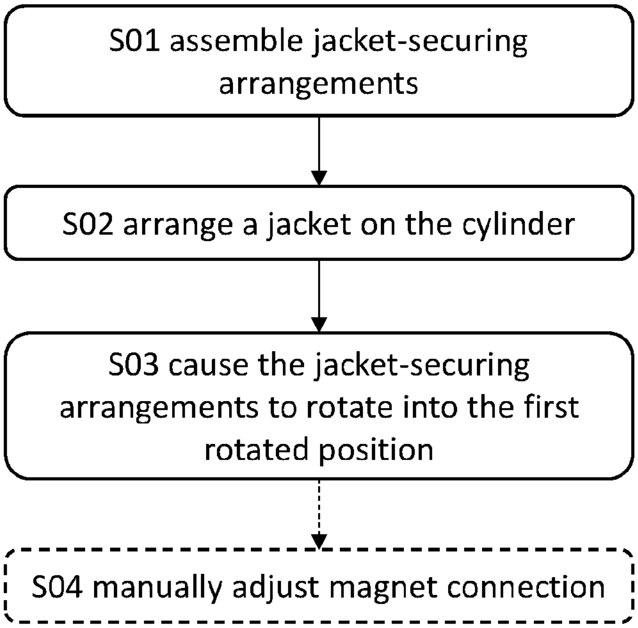
FIG. 19 shows a flowchart of a method for installing a jacket-securing arrangement and a cylinder jacket, according to embodiments of the present invention.

Referring now to FIG. 19, a method is disclosed for installing a jacket-securing arrangement 270 and a cylinder jacket 225 on a cylinder 220 (or 520). The method comprises:

a) Step S01 assembling a plurality of jacket-securing arrangements 270, each jacket-securing arrangement 270 comprising (i) a magnet 280, (ii) a first member 272 holding the magnet, and (iii) a second member 274 that is reversibly attachable to the first member 272, such that each assembled jacket-securing arrangement 270 is disposed in a respective inter-gripper region 353 and rotatably mounted around the gripper shaft 351.

b) Step S02 arranging, on the cylinder 220 (or 520), a jacket 225 having a plurality of tabs 229 extending therefrom, such that each of the tabs 229 is disposed in a corresponding inter-gripper region 353.

c) Step S03 causing each of the jacket-securing arrangements 270 to rotate around the gripper shaft 351 to the first rotated position, so as to magnetically secure each of the jacket tabs 229 to a surface portion of the cylinder gap 320 (or 620).

In some embodiments, the method additionally comprises the following optional step:

d) Step S04 when the assembled jacket-securing arrangements 270 are in the first rotated position, and the corresponding jacket tabs 229 are secured to the surface of the cylinder gap 320 (or 520), manually adjusting a connecting arrangement 281 between a magnet 280 and a respective jacket-securing arrangement 270 so as to improve the contact between the magnet 280 and the surface of the cylinder gap 320 (or 620) at a respective first location 321.

Figure 20:
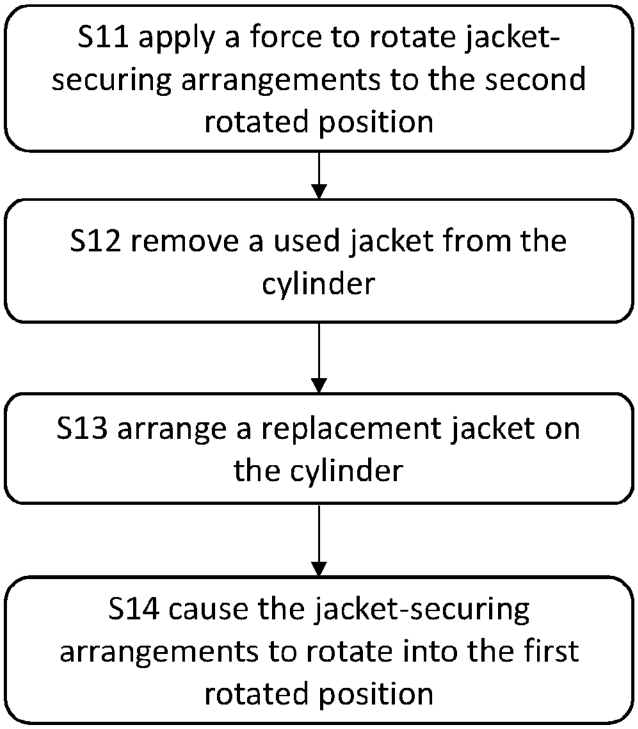
FIG. 20 shows a flowchart of a method for replacing a cylinder jacket on a cylinder, according to embodiments of the present invention.

Referring now to FIG. 20, a method is disclosed for replacing a cylinder jacket 225 on a cylinder 220 (or 520) on which jacket-securing arrangements 270 are installed according to any of the embodiments disclosed herein. The method comprises:

a) Step S11 applying a force F (or F) at a respective force-receiving surface 277 of each of the jacket-securing arrangements 270, so as to rotate the jacket-securing arrangements 270 to the second rotated position and thereby release the jacket tabs 229 from being magnetically secured to the surface of the cylinder gap 320 (or 620).

b) Step S12 removing the used jacket 225 from the cylinder 220 (or 520).

c) Step S13 arranging a replacement jacket 225 on the cylinder 220 (or 520), such that each of the tabs 229 is disposed in a corresponding inter-gripper region 353.

d) Step S14 causing each of the jacket-securing arrangements 270 to rotate around the gripper shaft 351 to the first rotated position, so as to magnetically secure each of the tabs 229 of the replacement jacket 225 to the surface of the cylinder gap 320 (or 620).

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains. Accordingly, the present invention is intended to embrace all such alternatives, modifications and variations and to be bound only by the spirit and scope of the disclosure and any change which come within their meaning and range of equivalency.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

As used herein, the terms “configured to”, “adapted to”, “operative to”, “suitable for”, “made to”, and “designed to” may be used interchangeably to indicate the ability or capability of an element or structure to perform its recited function.

In the description and claims of the present disclosure, each of the verbs, “comprise”, “include” and “have”, and conjugates thereof, are used to indicate that the object or objects of the verb are not necessarily a complete listing of features, members, steps, components, elements or parts of the subject or subjects of the verb. As used herein, the singular form “a”, “an” and “the” include plural references unless the context clearly dictates otherwise.

Parts of GB patent application No. 1903768.8, filed on Mar. 19, 2019, from which the present application claims convention priority, have been omitted from the present specification only in the interest of brevity and not on account of their contents being disclaimed. In view of the incorporation of GB 1903768.8 herein by reference, its entire contents should be deemed to form part of the present specification.

The invention claimed is:

1. A printing system comprising:

a. an intermediate transfer member (ITM) comprising a flexible belt operable to have ink images formed thereupon by droplet deposition at an image-forming station; and b. an impression station configured for transfer of the ink image to substrate after they are conveyed to the impression station by the ITM, the impression station comprising:

i. a rotatable impression cylinder having a cylinder gap that houses a plurality of grippers spaced along a gripper shaft so as to define a plurality of inter-gripper regions, each gripper of the plurality of grippers being disposed in the cylinder gap of the impression cylinder;

ii. a jacket disposed around a portion of the circumference of the impression cylinder, the jacket comprising multiple tab portions; and iii. a jacket-securing arrangement for securing a tab portion of the jacket to the rotatable impression cylinder, the jacket-securing arrangement comprising:

a. a magnet;

b. a first member, configured for holding the magnet; and c. a second member, detachably attachable to the first member, the first and the second members being adapted to be rotatably mounted around the gripper shaft when disposed in an assembled state in one of the inter-gripper regions, wherein when in said assembled state, the jacket-securing arrangement is configured to magnetically secure the jacket tab portion to the impression cylinder when in a first rotated position and not to magnetically secure the jacket tab portion to the impression cylinder when in a second rotated position, and wherein a plurality of the jacket-securing arrangements is arranged to secure a corresponding plurality of the jacket tab portions to a surface of the cylinder gap, said plurality of jacket-securing arrangements being disposed in said respective assembled states within the cylinder gap such that each jacket-securing arrangement of the plurality of jacket-securing arrangements is disposed in a respective inter-gripper region.

2. The printing system of claim 1, wherein magnetically securing the jacket tab portion to the impression cylinder includes magnetically securing the jacket tab portion to a surface of the cylinder gap.

3. The printing system of claim 1, wherein at least one of the first and second members has a respective volume for receiving a part of the circumference of the gripper shaft.

4. The printing system of claim 1, wherein:

i. the impression cylinder comprises a second impression cylinder gap and a second plurality of grippers housed therewithin and spaced along a second gripper shaft so as to define a second plurality of inter-gripper regions, ii. the impression station additionally comprises (A) a second jacket disposed around a second portion of the circumference of the cylinder, the second jacket comprising multiple tabs, and (B) a second plurality of jacket-securing arrangements for securing a corresponding plurality of the tabs of the second jacket to the cylinder, each jacket-securing arrangement comprising respective first and second members that am reversibly attachable to each other, each respective first member holding a magnet, and iii. when the jacket-securing arrangements of the second plurality of jacket-securing arrangements are in respective assembled states and rotatably mounted around the second gripper shaft in respective inter-gripper regions, said jacket-securing arrangements are operative to reversibly secure corresponding tabs of the second jacket magnetically to a surface portion of the second cylinder gap.

5. An installation method comprising:

a. arranging a Jacket on an impression cylinder, the impression cylinder comprising a cylinder gap and a plurality of grippers disposed therewithin, the plurality of grippers housed by the cylinder gap and spaced along a gripper shaft so as to define a plurality of inter-gripper regions, the jacket having a plurality of tab portions extending therefrom, such that each of the tabs is disposed in a corresponding inter-gripper region, the impression cylinder further comprising a jacket-securing arrangement comprising:

A. a magnet;

B. a first member, configured for holding the magnet; and

C. a second member, detachably attachable to the first member, the first and the second members being adopted to be rotatably mounted around the gripper shaft when disposed in an assembled state in one of the Inter-gripper regions, wherein when in said assembled state, the jacket-securing arrangement is configured to magnetically secure the jacket tab portion to the impression cylinder when in a first rotated position and not to magnetically secure the jacket tab portion to the impression cylinder when in a second rotated position; and b. rotating at least one of a plurality of the jacket-securing arrangements around the gripper shaft so as to magnetically secure a corresponding one or more of the jacket tabs to the cylinder gap, wherein the method is performed such that the plurality of the jacket-securing arrangements is disposed in said respective assembled states within the cylinder gap such that each jacket-securing arrangement of the plurality of jacket-securing arrangements is disposed in a respective inter-gripper region.

6. A printing system comprising:

a. an intermediate transfer member (ITM) comprising a flexible belt operable to have ink images formed thereupon by droplet deposition at an image-forming station; and b. an impression station configured for transfer of the ink images to substrate after they are conveyed to the impression station by the ITM, the impression station comprising:

i. a rotatable impression cylinder having a cylinder gap that houses a plurality of grippers spaced along a gripper shaft so as to define a plurality of inter-gripper regions, each gripper of the plurality of grippers being disposed in the cylinder gap of the impression cylinder;

ii. a jacket disposed around a portion of the circumference of the impression cylinder, the jacket comprising multiple tab portions; and iii. a jacket-securing arrangement for securing a tab portion of the jacket to the rotatable impression cylinder, the jacket-securing arrangement comprising:

a. a first member having a magnet affixed thereto; and b. a second member, detachably attachable to the first member, the first and the second members being adapted to be rotatably mounted around the gripper shaft when disposed in an assembled state in one of the inter-gripper regions, wherein (i) when disposed in said assembled state in said one of the inter-gripper regions, the jacket-securing arrangement is configured to magnetically secure the jacket tab portion to the impression cylinder when in a first rotated position, and (ii) when the jacket-securing arrangement is in the first rotated position, application of a force at a respective force-receiving surface is effective to release the jacket tab portion from being secured magnetically by causing the jacket-securing arrangement to rotate from the first rotated position to the second rotated position, and wherein a plurality of the jacket-securing arrangements is arranged to secure corresponding jacket tab portions to the impression cylinder, said plurality of jacket-securing arrangements being disposed in said respective assembled states within the cylinder gap such that each jacket-securing arrangement of the plurality of jacket-securing arrangements is disposed in a respective inter-gripper region.

7. The printing system of claim 6, wherein when the magnet is in the first rotated position, it is in contact or near contact with a magnet target location on a surface portion of the cylinder gap.

8. The printing system of claim 7, wherein when the magnet is in the second position, it is out of contact or near contact with the magnet target location on said surface portion of the cylinder gap.

9. The printing system of claim 7, wherein the force-receiving surface is being within +/−30° of perpendicular to said surface portion of the cylinder gap and the force is in a direction that is within +/−30° of parallel to said surface portion of the cylinder gap.

10. The printing system of claim 7, the force-receiving surface being within +/−15° of perpendicular to said surface portion of the cylinder gap and the force is in a direction that is within 1+/−15° of parallel to said surface portion of the cylinder gap.

11. The printing system of claim 6, wherein a. the jacket comprises N tabs TAB(1) . . . TAB(N) extending from a first end of the jacket, each of the N tabs TAB(n)having a respective width value TAB-WIDTH(n) and a respective spacing value TAB-SPACING(n), b. the plurality of gripper-regions includes a subset of N inter-gripper regions REGION(1) . . . REGION(N) corresponding to the N tabs, each of the N inter-gripper regions REGION(n) of the subset having a respective width value REGION-WIDTH(n) and a respective spacing value REGION-SPACING(n), c. the arranging of the jacket on the cylinder is such that TAB(1) is in REGION(1), and TAB(N) is in REGION (N), and d. for each value of n from 1 to N, TAB-WIDTH(n) is not greater than REGION-WIDTH(n), and TAB-SPACING(n) is substantially equal to REGION-SPACING (n).

12. The printing system of claim 6, wherein:

i. each force-receiving surface is a surface of a force-receiving portion having a thickness that is variable in a direction that is radial with respect to the gripper shaft, ii. for the plurality of jacket-securing arrangements, not all of the force-receiving portions have the same variable thickness, such that no more than three force-receiving portions have the same variable thickness, the differences in variable thickness being in a direction that is substantially normal to a longitudinal axis of the gripper shaft, and iii. when the jacket-securing arrangements ae in said respective assembled states and in the first rotated position, the differences in variable thickness are such that not all of the force-receiving surfaces re disposed at the same angle of rotation with respect to the gripper shaft.

13. An installation method comprising:

a. arranging a jacket on an impression cylinder, the impression cylinder comprising a cylinder gap and a plurality of grippers disposed therewithin, the plurality of gripers housed by the cylinder gap and spaced along a gripper shaft so as to define a plurality of inter-gripper regions, the jacket having a plurality of tab portions extending therefrom, such that each of the tabs is disposed in a corresponding inter-gripper region, the impression cylinder further comprising a jacket-securing arrangement comprising:

i. a first member having a magnet affixed thereto; and ii. a second member, detachably attachable to the first member, the first and the second members being adapted to be rotatably mounted around the gripper shaft when disposed in an assembled state in one of the inter-gripper regions, wherein (A) when disposed in said assembled state in said one of the inter-gripper regions, the jacket-securing arrangement is configured to magnetically secure the jacket tab portion to the impression cylinder when in a first rotated position, and (B) when the jacket-securing arrangement is in the first rotated position, application of a force at a respective force-receiving surface is effective to release the jacket tab portion from being secured magnetically by causing the jacket-securing arrangement to rotate from the first rotated position to the second rotated position; and b. rotating at least one of a plurality of the jacket-securing arrangements around the gripper shaft so as to magnetically secure a corresponding one or more of the jacket tabs to a surface portion of the cylinder gap, wherein the method is performed such that the plurality of the jacket-securing arrangements it disposed in said respective assembled states within the cylinder gap such that each jacket-securing arrangement of the plurality is disposed in a respective inter-gripper region.

14. A method for replacing a cylinder jacket on an impression cylinder comprising a cylinder gap and a plurality of gripper disposed therewithin, the plurality of grippers housed by the cylinder gap and spaced along a gripper shaft so as to define a plurality of inter-gripper regions, the impression cylinder further comprising a jacket-securing arrangement comprising (i) a first member having a magnet affixed thereto; and (ii) a second member, detachably attachable to the first member, the first and the second members being adapted to be rotatably mounted around the gripper shaft when disposed in an assembled state in one of the inter-gripper regions, wherein (A) when disposed in said assembled state in said one of the inter-gripper regions, the jacket-securing arrangement is configured to magnetically secure the jacket tab portion to the impression cylinder when in a first rotated position, and (B) when the jacket-securing arrangement is in the first rotated position, application of a force at a respective force-receiving surface is effective to release the jacket tab portion from being secured magnetically by causing the jacket-securing arrangement to rotate from the first rotated position to the second rotated position, a plurality of the jacket-securing arrangements being disposed in said respective assembled states within the cylinder gap such that each jacket-securing arrangement of the plurality is disposed in a respective inter-gripper region, wherein the cylinder jacket comprises a plurality of tabs extending therefrom along an edge of the jacket, and the jacket-securing arrangements are in a first rotated position such that the jacket tabs am magnetically secured to a surface portion of the cylinder gap, the method comprising:

a. applying a force to rotate the jacket-securing arrangements to a second rotated position and thereby release the jacket tabs from being magnetically secured to said surface portion;
b. removing the jacket from the cylinder;
c. providing a replacement jacket comprising a plurality of tabs;
d. arranging the replacement jacket on the impression cylinder, such that each of the tabs is disposed in a corresponding inter-gripper region, and
e. rotating each of the jacket-securing arrangements around the gripper shaft to the first rotated position, so as to magnetically secure each of the tabs of the replacement jacket to said surface portion of the cylinder gap.

15. The method of claim 14, wherein the force applied to the force-receiving surfaces is applied using a substantially straight, rigid bracket held substantially parallel to the gripper shaft, the applying of force being effective to cause rotation of the jacket-securing arrangements from the first rotated position to the second rotated position in a sequence that begins with rotation of the jacket-securing arrangements having the force-receiving portions with the largest variable thickness and that ends with rotation of the jacket-securing arrangements having the force-receiving portions with the smallest variable thickness.

16. The method of claim 15, wherein the rigid bracket includes a plurality of protrusions, and each of the force-receiving portions having the largest variable thickness includes a protrusion-receiving portion for receiving a respective one of the plurality of protrusions.

* * * * *